(12) United States Patent
Kodama et al.

(10) Patent No.: US 9,086,520 B2
(45) Date of Patent: Jul. 21, 2015

(54) ANTI-GLARE SHEET FOR LIQUID CRYSTAL DISPLAY DEVICE

(75) Inventors: Takashi Kodama, Tokyo (JP); Gen Furui, Tokyo (JP); Makoto Honda, Tokyo (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 358 days.

(21) Appl. No.: 13/640,789

(22) PCT Filed: Apr. 13, 2011

(86) PCT No.: PCT/JP2011/059185
§ 371 (c)(1),
(2), (4) Date: Oct. 12, 2012

(87) PCT Pub. No.: WO2011/129367
PCT Pub. Date: Oct. 20, 2011

(65) Prior Publication Data
US 2013/0027641 A1 Jan. 31, 2013

(30) Foreign Application Priority Data
Apr. 14, 2010 (JP) ................................. 2010-092765

(51) Int. Cl.
G02F 1/1335 (2006.01)
G02B 5/02 (2006.01)
G02B 13/20 (2006.01)

(52) U.S. Cl.
CPC ............ G02B 5/0221 (2013.01); G02B 5/0242 (2013.01); G02F 1/133502 (2013.01); G02F 1/133504 (2013.01); G02F 2202/22 (2013.01); Y10T 29/49 (2015.01)

(58) Field of Classification Search
CPC .............. G02F 1/133504; G02F 2001/133507; G02B 5/0294
USPC ..................................... 349/112, 64; 359/599
See application file for complete search history.

(56) References Cited

U.S. PATENT DOCUMENTS

2008/0192353 A1* 8/2008 Nagahama et al. ........... 359/599

FOREIGN PATENT DOCUMENTS

JP 2002-267818 9/2002
JP 2006-81089 3/2006
(Continued)

OTHER PUBLICATIONS

English translation of International Preliminary Report on Patentability and Written Opinion issued Nov. 6, 2012 in International (PCT) Application No. PCT/JP2011/059185.
(Continued)

*Primary Examiner* — Nathanael R Briggs
(74) *Attorney, Agent, or Firm* — Wenderoth, Lind & Ponack, L.L.P.

(57) ABSTRACT

To provide an anti-glare sheet for a liquid crystal display device with excellent vivid complexion and blackness and excellent image crispness, that is suitable for combination of dynamic images and still images.
An anti-glare sheet for a liquid crystal display device having a diffusion factor in the interior on at least one side of a transparent base material and provided with a functional layer with an irregular surface on the side opposite the transparent base material side, and either having or not having a transparent resin layer with a film thickness of 1.0 μm or greater on the side of the functional layer opposite the transparent base material side, the anti-glare sheet for a liquid crystal display device satisfying the following inequalities (1), (2), (3) and (4), where Q is the intensity of regular transmission, U is the transmission intensity determined by extrapolating a straight line connecting the transmission intensities at regular transmission ±2 degree and regular transmission ±1 degree, to regular transmission, when visible light rays have been irradiated on the anti-glare sheet for a liquid crystal display device, T (μm) is the sum of the thicknesses of the layer having a diffusion factor in the interior and the transparent resin layer, Ha (%) is the haze of the anti-glare sheet for a liquid crystal display device, and Hi (%) is the haze produced by internal diffusion factors.

2.15<$Q/U$<24.18    (1)

0.2%<$Ha-Hi$<13.7%    (2)

1.3%≤$Hi$<35.0%    (3)

2.3 μm<$T$<12.4 μm    (4)

18 Claims, 13 Drawing Sheets

(56) References Cited

FOREIGN PATENT DOCUMENTS

| | | |
|---|---|---|
| JP | 2006-189658 | 7/2006 |
| JP | 2007-17626 | 1/2007 |
| JP | 2007-264113 | 10/2007 |
| JP | 2007-334294 | 12/2007 |
| JP | 2008-32845 | 2/2008 |
| JP | 2010-60924 | 3/2010 |
| JP | 2010-60925 | 3/2010 |
| JP | 2010060925 A * | 3/2010 |
| JP | 2010-122710 | 6/2010 |
| JP | 2010-128255 | 6/2010 |

OTHER PUBLICATIONS

International Search Report issued Jul. 12, 2011 in International (PCT) Application No. PCT/JP2011/059185, of which the present application is the national stage.

* cited by examiner

ANTI-GLARE SHEET FOR LIQUID CRYSTAL DISPLAY DEVICE

TECHNICAL FIELD

The present invention relates to an anti-glare sheet for a liquid crystal display device with excellent vivid complexion and blackness, excellent blackness in dark surroundings and excellent image crispness, that is suitable for combination of dynamic images and still images.

BACKGROUND ART

Optical sheets used for display device surfaces have layers with functions such as an anti-glare property, antistatic property and antifouling property, laminated as functional layers on the observer side of a transparent base material. To exhibit these functions, in order to impart an anti-glare property for example, methods of forming irregularities on the surface layer or adding diffusion particles to the resin forming the surface layer are employed. Conductive fine particles or a conductive resin may be added to impart an antistatic property, or a fluorine-containing polymer or stain-proofing agent may be added in order to impart an antifouling property.

Since such diffusion particles, conductive fine particles and additives are not completely phase-soluble with surface layer-forming resins, an optical sheet that employs them has a function of diffusing visible light. The irregular sections of the surface layer also have the function of diffusing visible light.

In addition, irregularities larger than the visible light wavelength range are formed in the surface layer, the transparent base material back side and between each layer in order to prevent interference patterns between optical sheets and interference patterns between optical sheets and display devices, and such irregularities also have the function of diffusing visible light.

According to the invention, such causes of visible light scattering are defined as "diffusion factors", and the presence of such diffusion factors causes the anti-glare sheet for a liquid crystal display device to have reduced contrast due to reflection of external light. In other words, an anti-glare sheet for a liquid crystal display device should maintain the function of the optical sheet while preventing loss of contrast.

Among the aforementioned diffusion factors, the haze exhibited by surface irregularities is defined as the "surface haze" while the haze exhibited when smoothing has been performed using the resin that forms such surface irregularities, or a resin with a difference in refractive index of at least 0.02 from such a resin, is defined as the "internal haze", and these are measured according to JIS K 7136.

The haze value, or the ratio of the internal haze and total haze, is commonly used as a simple method for evaluating contrast. Specifically, it has been considered that an optical sheet with low contrast reduction can be produced by specifying the materials and controlling the production conditions in the optical sheet production process for a lower haze value (see Patent documents 1-3).

However, contrast often differs even with the same haze value, and it has been found that, even with production using the haze value and the ratio of the internal haze and total haze as indexes, for example, it is not always possible to stably produce a satisfactory anti-glare sheet for a liquid crystal display device.

In addition, it has been attempted to lower the reflectance by additionally providing a low-refraction interference layer on the anti-glare layer, but this requires precise formation of a film of about 100 nm, and is extremely expensive.

In recent years, moreover, with the widening use of delivery systems including "one seg", it has become increasingly possible to view both still images and dynamic images on the same display. Opportunities are also increasing for film appreciation, whereby images are enjoyed in prepared monitoring environments. The image quality demanded for display terminals has therefore also undergone a change, leading to demand for development of an anti-glare sheet for a liquid crystal display device with excellent suitability for combinations of still images and dynamic images, and notably excellent high levels of blackness in dark surroundings.

As illustrated by Patent documents 4 and 5, for example, different performance is required for still images and dynamic images, while visual observation environments of observers also differ.

As a result of diligent research on such conflicting problems, the present inventors have found that the balance between internal diffusion and surface diffusion that has been considered in the prior art does not account for the total haze, but that in addition to the internal diffusion and surface diffusion, the total haze is affected by how these two diffusion factors are related to each other in the anti-glare sheet.

The present inventors have also found, as a result of conducting diligent research on the performance required by anti-glare sheets for liquid crystal display devices for high blackness in dark surroundings and for dynamic images and still images, that in order to obtain a high level of blackness in dark surroundings it is necessary to exhibit diffusion properties of a nature such that virtually no "stray light component" is produced, which has not been considered in the past, and the "stray light component" must be considered for projected light of dynamic images and still images, and that in order to obtain image quality worthy of appreciation it is important to consider the stray light component while providing a suitable regular reflection component, for which only prevention has been considered in the past.

In other words, as regards stray light due to internal diffusion, when dark sections (for example, black) and light sections (for example, white) are present in the same screen, projected light in the light sections is partially presented as stray light due to diffusion factors inside the optical film and surface irregularities (surface diffusion factors), while "flares", or light emitted from dark sections (light of the image that is reflected or diffused in a complex manner, due to various factors inside the image display device, before exiting the surface of the image device, thereby failing to be directed to the ideal location for the image output such that the image on the surface of the image device becomes partially whitened, appearing as blurred light and reducing the image quality) not only cause reduced contrast, and especially reduced contrast in dark surroundings, but also eliminate the stereoscopic visual effect and result in a planar, featureless image. The stray light is minimally affected on the front face, but is more powerfully affected in oblique directions.

In regard to the regular reflection component, it was found that an optical film with extremely low regular reflection prevents clear presentation of images and results in their perception as simulations, whereas an optical film with an appropriate regular reflection component presents clear images and tends to result in their perception as actual objects, increasing the unique gloss and brightness of images on a dynamic image screen, to produce images with a sense of motion.

The performance that includes contrast, a stereoscopic visual effect and motion, that are required for such dynamic images (for example, for a scene with a youth under a blue sky, the black hair displayed on the screen is smooth black allowing each individual hair to be visible, while the black pupils are moist black, and the skin is visible in the vivid brilliance characteristic of youth) will be referred to as "vivid complexion and blackness".

Still images must have excellent contrast and prevention of unwanted reflection, and such performance of contrast and prevention of unwanted reflection required for still images will be referred to as "image crispness". In other words, anti-glare sheets for liquid crystal display devices with excellent vivid complexion and blackness and image crispness are desired.

Moreover, in recent years, demand has been increasing for anti-glare sheets with excellent "blackness in dark surroundings", which is a degree of notable, high-level blackness under modern conditions for appreciation, such as for film appreciation, or in other words, appreciation under dark surrounding conditions without external light.

Conventional evaluation of image quality has included the "black tightness" mentioned in Patent document 6 and "glazed black feel", mentioned in Patent document 7.

In order to improve narrowness of angle, which is a fundamental defect in liquid crystal displays, anti-glare sheets are often provided with diffusibility. However, providing diffusibility can lower contrast, especially for frontal viewing.

Black tightness is evaluated as a compromise between viewing angle enlargement and contrast, and comparing blackness during power-off and blackness during power-on (black images) directly from the front of the display, with a more intense blackness being evaluated as a more powerful tight feel for the screen.

Due to the system structure of a liquid crystal display, light leaking from the liquid crystal display unit itself (leaked light) is present even during black display, and therefore the blackness during power-on, as seen directly from the front, is the level of blackness resulting from a combination of this leaked light and external light reflection, while blackness during power-off is the blackness with only from external light reflection, since no projected light is present.

Stated differently, "black tightness" means an intense level of blackness against both external light and leaked light, without consideration of stray light, unlike the aforementioned vivid complexion and blackness, and also without consideration of an appropriate necessary level for the regular reflection component, and therefore even if the contrast is high, the gloss and brightness of the image is inferior, no motion is produced, and the vivid complexion and blackness is not increased.

Also, "glazed black feel" is black reproducibility when an image display device displays black in a light environment, i.e., abundant expression of graded black. The measurement is performed after attachment to a cross nicol polarizing plate or a black acrylic board via an acrylic pressure-sensitive adhesive for optical films (product with total light transmittance: ≥90%, haze: ≤0.5%, film thickness: 10-55 μm, such as the MHM Series by Nichiei Kakoh Co., Ltd., or "L8010" by Hitachi Chemical Co., Ltd.) on the side opposite the film side of an optical laminate, by visual evaluation under three band fluorescence. That is, with this measurement method, evaluation of moving images is not performed and the effect of stray projected light is completely ignored. Therefore, even with high gloss and brightness, no dark surrounding contrast or stereoscopic visual effect is produced, and the vivid complexion and blackness is not increased.

"Contrast" is the ratio of white luminance to black luminance, and since the absolute value of black luminance is small, the effect on contrast is greater. In order to obtain images with excellent contrast, it is necessary to have excellent "black tightness", as the improved viewing angle blackness, "blackness in dark surroundings" as the absolute blackness, and "glazed black feel" as abundant graded expression in the black region (hereinafter referred to as "excellent black reproducibility").

Also, in order to present both still images and moving images, it is necessary to exhibit excellence in terms of both vivid complexion and blackness with a stereoscopic visual effect and sense of motion, and image crispness.

With the inventions described in Patent documents 8 and 9, which limit the diffusion property of the anti-glare sheet, the contrast is satisfactory, but no consideration is given to the issues of physical performance including adhesiveness and hard coat properties, which are indispensable for practical use, or glare and presentation of both moving images and still images, and therefore sufficient performance has not been exhibited.

CITATION LIST

Patent Literature

[Patent document 1] Japanese Unexamined Patent Application Publication No. 2002-267818
[Patent document 2] Japanese Unexamined Patent Application Publication No. 2007-334294
[Patent document 3] Japanese Unexamined Patent Application Publication No. 2007-17626
[Patent document 4] Japanese Unexamined Patent Application Publication No. 2006-81089
[Patent document 5] Japanese Unexamined Patent Application Publication No. 2006-189658
[Patent document 6] Japanese Unexamined Patent Application Publication No. 2007-264113
[Patent document 7] Japanese Unexamined Patent Application Publication No. 2008-32845
[Patent document 8] Japanese Unexamined Patent Application Publication No. 2010-60924
[Patent document 9] Japanese Unexamined Patent Application Publication No. 2010-60925

SUMMARY OF INVENTION

Technical Problem

In light of these circumstances, it is an object of the present invention to provide an anti-glare sheet for a liquid crystal display device that has excellent physical properties, glare, black reproducibility and compatibility for moving images and still images, and in particular, exhibits an excellent high level of blackness in dark surroundings, vivid complexion and blackness, and image crispness, while also being suitable for practical use.

Solution to Problem

A trade-off exists between viewing angle and image quality for liquid crystal displays. In the past, liquid crystal television sets have had a narrow viewing angle, which has been considered a drawback from the viewpoint of substitution for isotropic CRTs, and larger viewing angles have also been desired for anti-glare films.

However, the present inventors decided to re-investigate the techniques described below, based on the idea of liquid crystal televisions as new displays and considering changes in viewing environments, with emphasis on frontal image quality.

Contrast and anti-glare properties have hitherto been considered to depend on surface form, which includes the arithmetic mean roughness (Ra), ten-point height of irregularities (Rz) and average spacing of surface irregularities (Sm), based on JIS B-0601-1994 which deals with surface irregularities, and the mean inclination angle of irregularities (θa), based on the definition described in the instruction manual of the surface roughness measuring instrument SE-3400 by Kosaka Laboratory, Ltd. (Version 1995.07.20), or have been considered to depend on the state of reflection of external light that is based on the difference in refractive index between the interior dispersing agent and binder resin, or the shapes of internally diffused particles.

In other words, the effect of interaction between surface irregularities and internal diffusion factors has not been considered.

The definition for calculating θa will now be explained. In an irregular shape existing within a range of reference length L, heights are present at the highest parts from one raised section to the next raised section, and recesses are present at either end. The positions of the recesses are not necessarily at the same height. The heights from each recess position to the triangular tip are designated as h1 and h2. Similarly, when the heights of all of the raised sections in the reference length range are measured from the recesses to the tips (each raised section having two heights), and the sum of the heights is determined, calculation of the arctangent of the value divided by the reference length L yields the angle.

$$\theta a = \tan^{-1}[(h1+h2+h3+h4+\ldots+hn)/L]$$

The present inventors have found that the diffusion properties are significantly different for light passing through the diffused particles and for reflected light, from projected light incident to the diffused particles and external light, due to the difference in refractive indexes of the internally diffused particles and binder resin, as shown in FIGS. 11-1 to 11-4, and that a larger difference in refractive index between the diffused particles and binder increases the amount of light reflected by the diffused particles and increases the diffusion angle of light passing through the diffused particles, such that generation of stray light due to projected light increases, the amount of light reflected from external light increases, and the contrast is lowered.

It was further found that, in regard to projected light as shown by 1-1 to 1-5 in FIG. 10-1, the transmission and reflectance properties of projected light passing through the diffused particles, as well as generation of stray light which impairs resolution and contrast, differ significantly due to the positional relationship between the diffused particles and surface irregularities, and also that in regard to external light, as shown by 2-1 to 2-4 in FIG. 10-2, the generation of stray light that impairs the reflectance properties and contrast of light reflected by the diffused particles, from external light incident to the diffusion layer interior, differs significantly due to the positional relationship between the diffused particles and surface irregularities.

Furthermore, by incorporating the form of surface irregularities, the diffused particle properties and the relative positional relationship between the surface irregularities and internally diffused particles in an anti-glare sheet for a liquid crystal display device according to the present application, it has become possible to obtain an anti-glare sheet for a liquid crystal display device with not only excellent contrast and anti-glare property, but also excellent vivid complexion and blackness and image crispness.

Also, when the positional relationship between the surface irregularities and diffused particles is such that the diffusion of external light reflected by the diffused particles is large, as shown by the diffused particle 2-2 in FIG. 10-2, the diffusion of projected light is also large tending to produce stray light, as indicated by 1-2 in FIG. 10-1, thus also tending to result in contrast reduction due to the projected light.

That is, the magnitude relationship for contrast reduction by stray light from projected light can be considered to approximate the reflectance properties for external light. The same applies for vivid complexion and blackness due to stray light.

Also, this stray light generation is increased in the conventional methods that emphasize viewing angle, wherein LCD leaked light is widely diffused by providing wide-angle diffusion, even with low anti-glare layer strength.

The present inventors have found that, in order to obtain dynamic images with excellent vivid complexion and blackness, it is satisfactory for the anti-glare sheet for a liquid crystal display device to have low transmission diffusion, suitably high regular transmission intensity and high directivity of projected light, and to minimally reduce the stray light component of external light and projected light.

On the other hand, high transmission scattering generates stray light and lowers the directivity of projected light and causes images to appear straw-colored, such that vivid brilliance for display of flesh colors is not obtained.

That is, a low maximum transmission scattering angle is essential.

To obtain still images with excellent image crispness, however, it is necessary to achieve both contrast and prevention of unwanted reflection.

However, when the anti-glare property is increased to improve prevention of unwanted reflection, the reflected scattering increases, contrast is reduced and image crispness is impaired.

As a result of much diligent research on image crispness, the present inventors have found that a virtual image becomes a problem for an observer because, when an image is viewed, the form of the viewer himself or other external objects are reflected on the liquid crystal display device surface and the focus of the observer frequently meets at such generated external images, causing the focus to fail to settle on the original image.

As a result of further research, it was found that if the borders of a reflected external image are rendered indistinct, the virtual image is no longer a problem and contrast reduction can also be minimized, while resulting in improved image crispness.

In other words, in order to achieve both image crispness required for still images and vivid complexion and blackness for dynamic images, it was found that it is important to minimize the reduction in the regular transmission intensity component of transmission scattering, and appropriately ensure low reflected scattering that renders the borders of reflected external images indistinct, while also reducing the stray light component.

This means that the regular reflection intensity component is converted to diffusion near the regular reflection, and considering (a) to (c) below, it means that an anti-glare sheet for a liquid crystal display device can be obtained that exhibits both still image crispness and dynamic image vivid complexion and blackness. That is, it satisfies the three factors of: (a) low transmission scattering (high regular transmission intensity component), (b) a small regular reflection intensity component, and (c) conversion to diffusion near the regular reflection.

An optical sheet usually includes added conductive particles to impart an antistatic function or added fine particles to prevent glare or form surface irregularities, and it has internal diffusion other than the diffusion by the surface irregularities (hereunder referred to as "external diffusion").

FIG. 1 shows the results of a simulation of surface reflectance of a resin coating film with a refractive index of 1.50, and reflectance on the surfaces of spherical dispersing agent particles dispersed in the resin coating film, with varying particle refractive indexes.

As shown in FIG. 1, the reflection intensity by internal diffusion factors such as spherical dispersing agent particles is significantly smaller than the reflection intensity by external diffusion, and therefore surface diffusion is the dominant factor of the diffuse reflection intensity.

Also, diffusion of transmitted light by the surface form is $n \times \sin \theta = \sin \psi$ based on Snell's law, where $\psi$ is the emergence angle from the slanted surface at $\theta$ and n is the refractive index of the coating film, and the emergence angle $\psi$ is $\sin^{-1}(n \times \sin \theta) - \theta$.

Reflection, on the other hand, represents twice the change in the slanted surface at $\theta$, based on the law of reflection, and therefore the angle of reflection $\psi$ is $2 \times \theta$. Thus, within the ordinary range for coating film refractive indexes and optical sheet surface forms, the diffusion angles of reflection and transmission with respect to the surface inclination angle are proportional, as shown in FIG. 2 which has the results of calculation for a resin surface with a refractive index of 1.50.

That is, since low regular reflection intensity can be assumed to be low regular transmission intensity, and increasing the diffusion near regular reflection can be assumed to increase the diffusion near regular transmission, all three factors demanded for an anti-glare sheet for a liquid crystal display device with both prevention of unwanted reflection for still images and vivid complexion and blackness for dynamic images as described above, can be converted to transmission.

That is, factors (a) to (c) can be restated as: (a) low transmission scattering (high regular transmission intensity), (b') a low regular transmission intensity component, and (c') conversion to diffusion near regular transmission.

Factors (b') and (c') represent a small ratio Q/q between the regular transmission intensity (Q) and diffusion intensity near regular transmission (q), while (a) represents a large Q/q.

Incidentally, since the haze value hitherto used in anti-glare sheets for liquid crystal display devices is the ratio of light that has been diffused at least 2.5 degrees from regular transmission with respect to the total light rays, as indicated by JIS K7136, it is not possible, simply based on the haze value, to imagine using the aforementioned diffusion near regular transmission (especially diffusion of less than 2.5 degrees).

In addition, since it is impossible to prevent glare with an anti-glare sheet for a liquid crystal display device with absolutely no internal diffusion, it is necessary for at least a small degree of internal diffusion to be present.

The diffusion intensity near regular transmission in the case of isotropic diffusion was therefore considered.

As shown schematically in FIG. 3, in regard to the diffusion intensity, when a layer with diffuse transmission intensity distribution b is laminated on a transparent base with diffuse transmission intensity distribution a, the reduction rate of the diffuse transmission intensity is larger closer to 0 degrees, and therefore the reduction is greater with intensity closer to 0 degrees, and the anti-glare sheet for a liquid crystal display device has a diffuse transmission intensity distribution of c.

Also, since the internal diffusion factor (dispersing agent) and external diffusion factor (surface form) in an anti-glare sheet for a liquid crystal display device generally have sparse distribution, the intensity distribution of the diffusion property is the sum of the diffusion intensity distribution due to the diffusion factors and the two intensity distributions having only the intensity of regular transmission, without the diffusion factors.

As shown in FIG. 4, if the virtual regular transmission intensity (U) is defined as the intensity for the slopes of the intensity at regular transmission ±1 degree and regular transmission ±2 degree, that have been extrapolated from the regular transmission scattering angle, then U approximates the regular transmission intensity of the diffusion property due to diffusion factors, and Q/U is the ratio of "the intensity Q of the portion with no diffusion factor" and "the regular transmission intensity U of the diffusion factor portion", or in other words, the ratio of "the intensity Q of regular transmission without transmission scattering" and "the regular transmission intensity U guided in the direction of 0 degrees by transmission scattering", i.e. it is a measure of the state of diffusion near regular transmission.

FIG. 3 and FIG. 4 also show that U is larger with greater intensity near regular transmission, and that the change in U is smaller with a greater initial diffusion angle.

Stated differently, using U instead of the intensity q near regular transmission is a form of also incorporating the size of the (a) transmission scattering.

Thus, by limiting the range of Q/U to a specified range, it is possible to achieve a satisfactory balance between image crispness and dynamic image vivid complexion and blackness, to obtain an anti-glare sheet for a liquid crystal display device having both of these aspects of performance.

In other words, since in terms of the surface form (external diffusion factor), Q/U is approximately the ratio between the flat section which provides regular transmission and the concavoconvex section which provides transmission scattering, it is related to the concavoconvex slope angle and the percentage of concavoconvexities, while in terms of internal diffusion it is related to the difference in refractive indexes of the diffused particles and binder and the probability of collision of diffused particles and the shape, while in terms of interaction between the surface form and internal diffusion, it is related to how much further the interaction is weakened or strengthened, so that it determines the vivid complexion and blackness and quality of sharpness.

The present invention has been completed based on the knowledge described above, and it encompasses the following modes.

1. An anti-glare sheet for a liquid crystal display device having a diffusion factor in the interior on at least one side of a transparent base material and provided with a functional layer with an irregular surface on the side opposite the transparent base material side, and either having or not having a transparent resin layer with a film thickness of 1.0 μm or greater on the side of the functional layer opposite the transparent base material side, wherein the anti-glare sheet for a liquid crystal display device satisfies the following inequalities (1), (2), (3) and (4), where Q is the intensity in the diffuse regular transmission direction, U is the transmission intensity determined by extrapolating a straight line connecting the transmission intensities at diffuse regular transmission ±2 degree and diffuse regular transmission ±1 degree, to the diffuse regular transmission angle, when visible light rays have been irradiated on the anti-glare sheet for a liquid crystal display device, T μm is the sum of the thicknesses of the layer having an internal diffusion factor in the interior and the transparent resin layer, Ha % is the total haze of the anti-glare sheet for the liquid crystal display device, and Hi % is the haze produced by internal diffusion factors.

$$2.15 < Q/U < 24.18 \quad (1)$$

$$0.2\% < Ha - Hi < 13.7\% \quad (2)$$

$$1.3\% \leq Hi < 35.0\% \quad (3)$$

$$2.3 \ \mu m < T < 12.4 \ \mu m \quad (4)$$

2. The aforementioned anti-glare sheet for a liquid crystal display device, wherein Q/U is in the relationship specified by the following inequality.

$$2.24 \leq Q/U \leq 21.10$$

3. The aforementioned anti-glare sheet for a liquid crystal display device, wherein Q/U is in the relationship specified by the following inequality.

$$5.81 \leq Q/U \leq 14.81$$

4. The aforementioned anti-glare sheet, wherein Ha-Hi is such that $0.3\% \leq Ha-Hi \leq 11.4\%$.

5. The aforementioned anti-glare sheet, wherein T is such that $2.5 \ \mu m \leq T \leq 11.8 \ \mu m$.

6. The aforementioned anti-glare sheet, wherein Hi is such that $1.3\% \leq Hi \leq 34.4\%$.

7. The aforementioned anti-glare sheet, wherein Hi is such that $1.3\% \leq Hi \leq 16.9\%$.

8. The aforementioned anti-glare sheet for a liquid crystal display device, wherein the transparent base material is a cyclic polyolefin or triacetylcellulose.

9. The aforementioned anti-glare sheet for a liquid crystal display device, wherein the functional layer comprises translucent inorganic particles and/or translucent organic particles dispersed in a transparent resin, and irregularities are provided on the surface of the functional layer by the translucent inorganic particles and/or translucent organic particles.

10. The aforementioned anti-glare sheet for a liquid crystal display device, wherein the transparent base material comprises a cellulose-based resin, the functional layer comprises a transparent resin, the transparent resin is an ionizing radiation curable resin, the functional layer is formed by coating an ionizing radiation curable resin composition comprising the ionizing radiation curable resin on the transparent base material and subjecting it to crosslinking curing, the ionizing radiation curable resin composition comprises a solvent that is to be impregnated into the transparent base material and/or an ionizing radiation curable resin that is to be impregnated into the transparent base material, and a solvent that is not to be impregnated into the transparent base material and/or an ionizing radiation curable resin that is not to be impregnated into the transparent base material, and the amount of impregnation into the transparent base material is adjusted for control so that inequalities (1), (2), (3) and (4) above are satisfied.

11. The aforementioned anti-glare sheet for a liquid crystal display device, wherein the functional layer comprises a hard coat layer, and the steel wool scuff resistance is at least 200 g/cm².

12. The anti-glare sheet for a liquid crystal display device according to any one of 1. to 11. above, which has an antireflection functional layer formed on the uppermost surface layer.

13. A polarizing plate employing the anti-glare sheet for a liquid crystal display device according to any one of 1. to 12. above.

14. An image display device employing a polarizing plate according to 13. above.

15. A method for producing an anti-glare sheet for a liquid crystal display device, the anti-glare sheet for a liquid crystal display device having a diffusion factor in the interior on at least one side of a transparent base material and provided with a functional layer with an irregular surface on the side opposite the transparent base material side, and either having or not having a transparent resin layer with a film thickness of 1.0 μm or greater on the side of the functional layer opposite the transparent base material side, wherein the production is carried out so that the following inequality is satisfied:

$$2.15 < Q/U < 24.18$$

where Q is the intensity in the regular transmission direction, and U is the transmission intensity determined by extrapolating a straight line connecting the transmission intensities at regular transmission ±2 degree and regular transmission ±1 degree to regular transmission, when visible light rays have been irradiated on the anti-glare sheet for a liquid crystal display device.

Advantageous Effects of Invention

According to the invention it is possible to provide an anti-glare sheet for a liquid crystal display device with excellent vivid complexion and blackness and image crispness, where the vivid complexion and blackness and image crispness, which could not be evaluated by the conventional haze value, as seen in the graphs showing the relationship between total haze and image crispness and vivid complexion and blackness (FIG. 6), internal haze and image crispness and vivid complexion and blackness (FIG. 7) and internal haze/total haze and image crispness and vivid complexion and blackness (FIG. 8), are evaluated conveniently as seen in FIG. 9, which shows the relationship between Q/U and the vivid complexion and blackness and image crispness.

BRIEF DESCRIPTION OF DRAWINGS

FIG. 10-1 is a diagram illustrating the properties of transmitted light and reflected light based on the positional relationship of diffused particles and surface irregularities for projected light and external light.

FIG. 10-2 is a diagram illustrating the properties of transmitted light and reflected light based on the positional relationship of diffused particles and surface irregularities for projected light and external light.

FIG. 11-1 is a diagram illustrating the difference in diffusion properties of light based on the difference in refractive indexes of internally diffused particles and binder resin.

FIG. 11-2 is a diagram illustrating the difference in diffusion properties of light based on the difference in refractive indexes of internally diffused particles and binder resin.

FIG. 11-3 is a diagram illustrating the difference in diffusion properties of light based on the difference in refractive indexes of internally diffused particles and binder resin.

FIG. 11-4 is a diagram illustrating the difference in diffusion properties of light based on the difference in refractive indexes of internally diffused particles and binder resin.

DESCRIPTION OF EMBODIMENTS

The anti-glare sheet for a liquid crystal display device according to the invention is an anti-glare sheet for a liquid crystal display device having a functional layer on at least one side of a transparent base material and having a diffusion factor on the outer surface and/or the interior of the functional layer, one of the features thereof being that the conditions are controlled so that the relationship $2.15<Q/U<24.18$ is satisfied.

The method of measuring Q and U will now be explained with reference to FIG. 5.

Figure 5:
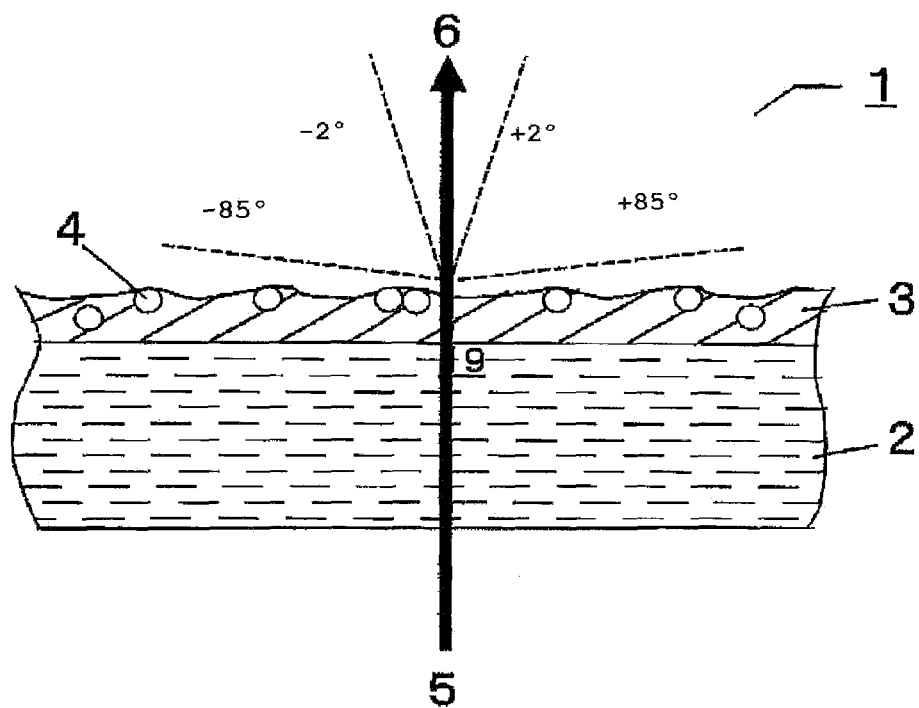
FIG. 5 is a conceptual drawing showing the method of measuring diffuse transmission intensity according to the invention.
Figure 6:
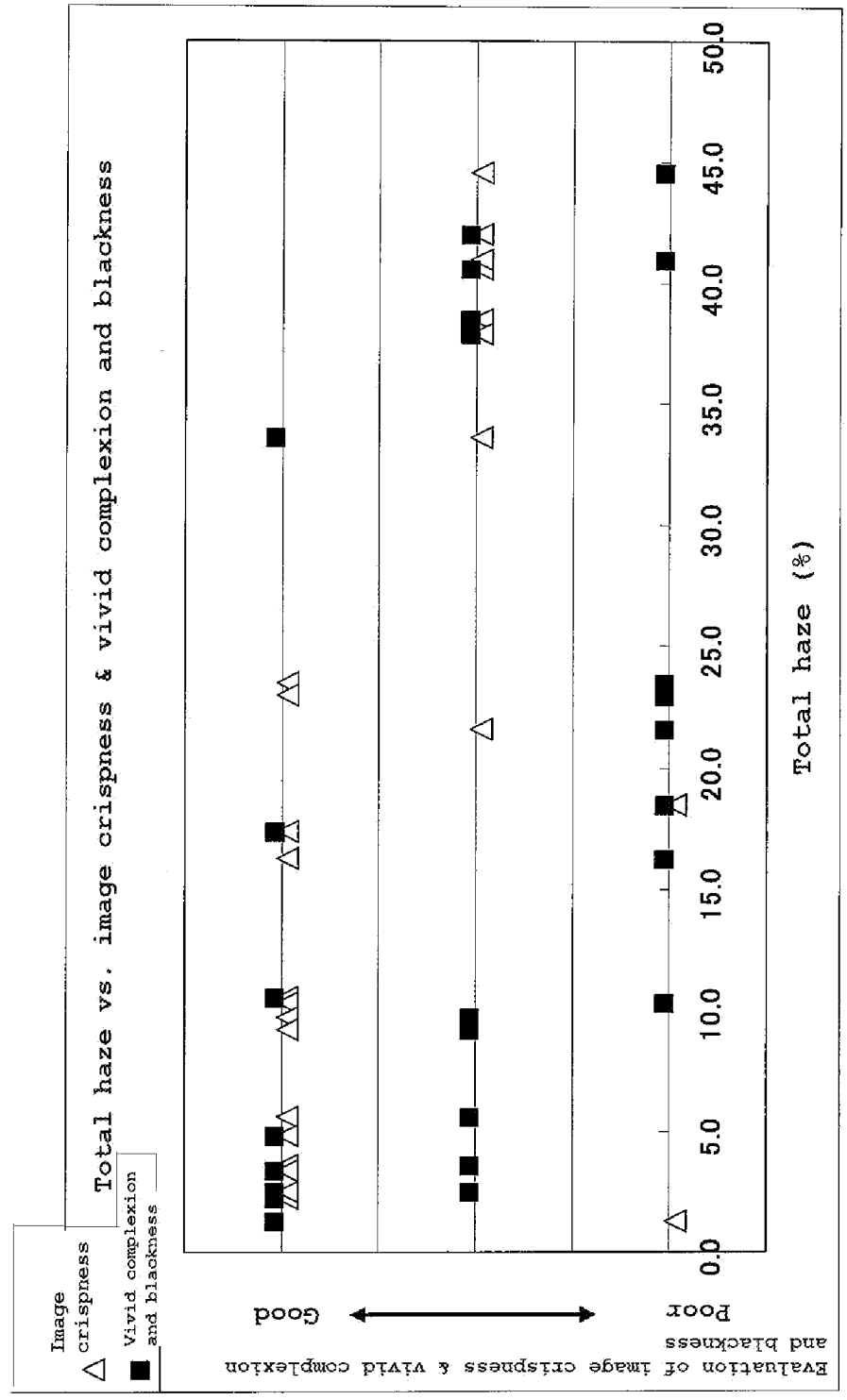
FIG. 6 is a graph showing the relationship between total haze, vivid complexion and blackness and image crispness.
Figure 7:
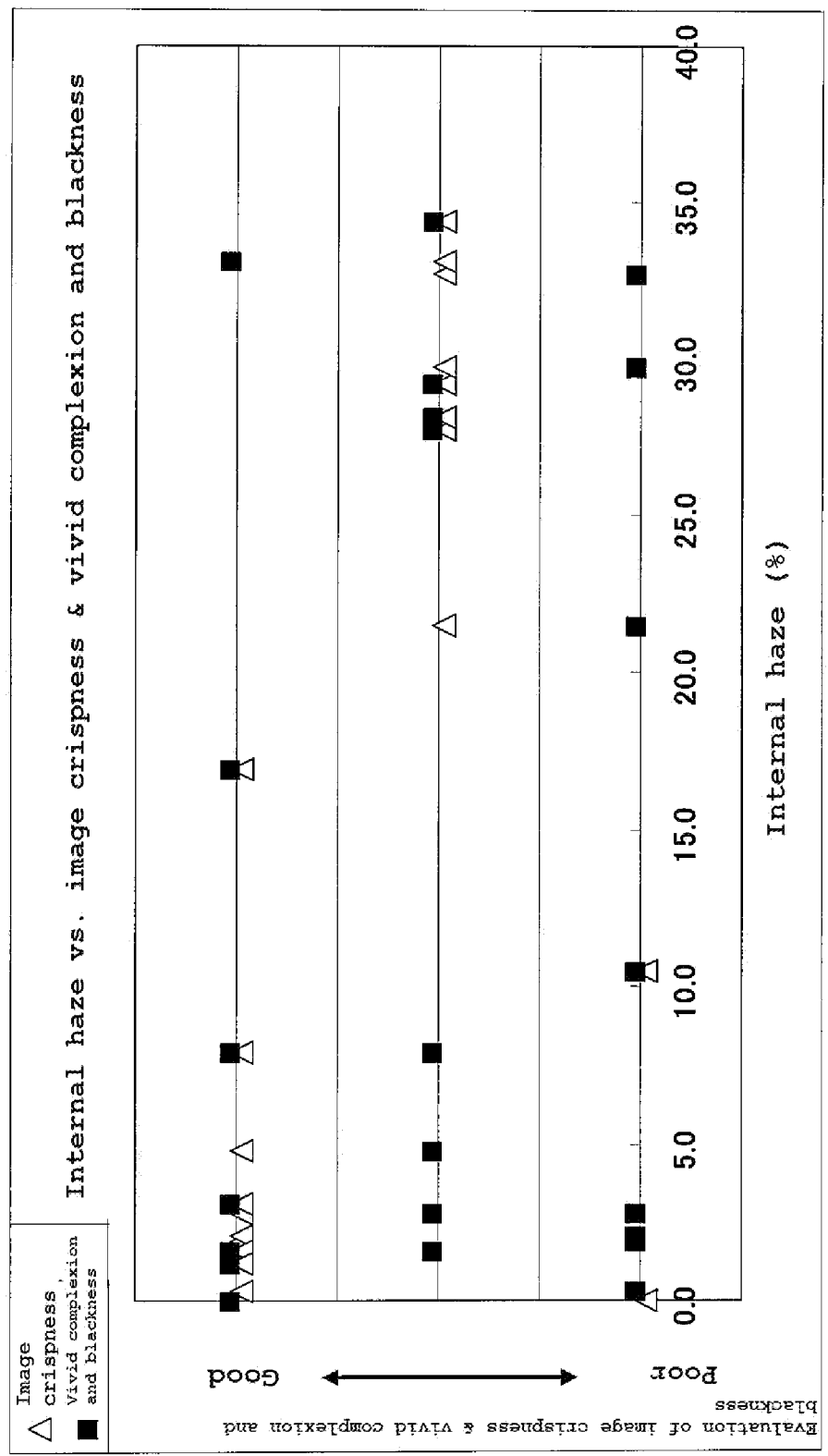
FIG. 7 is a graph showing the relationship between internal haze, vivid complexion and blackness and image crispness.
Figure 8:
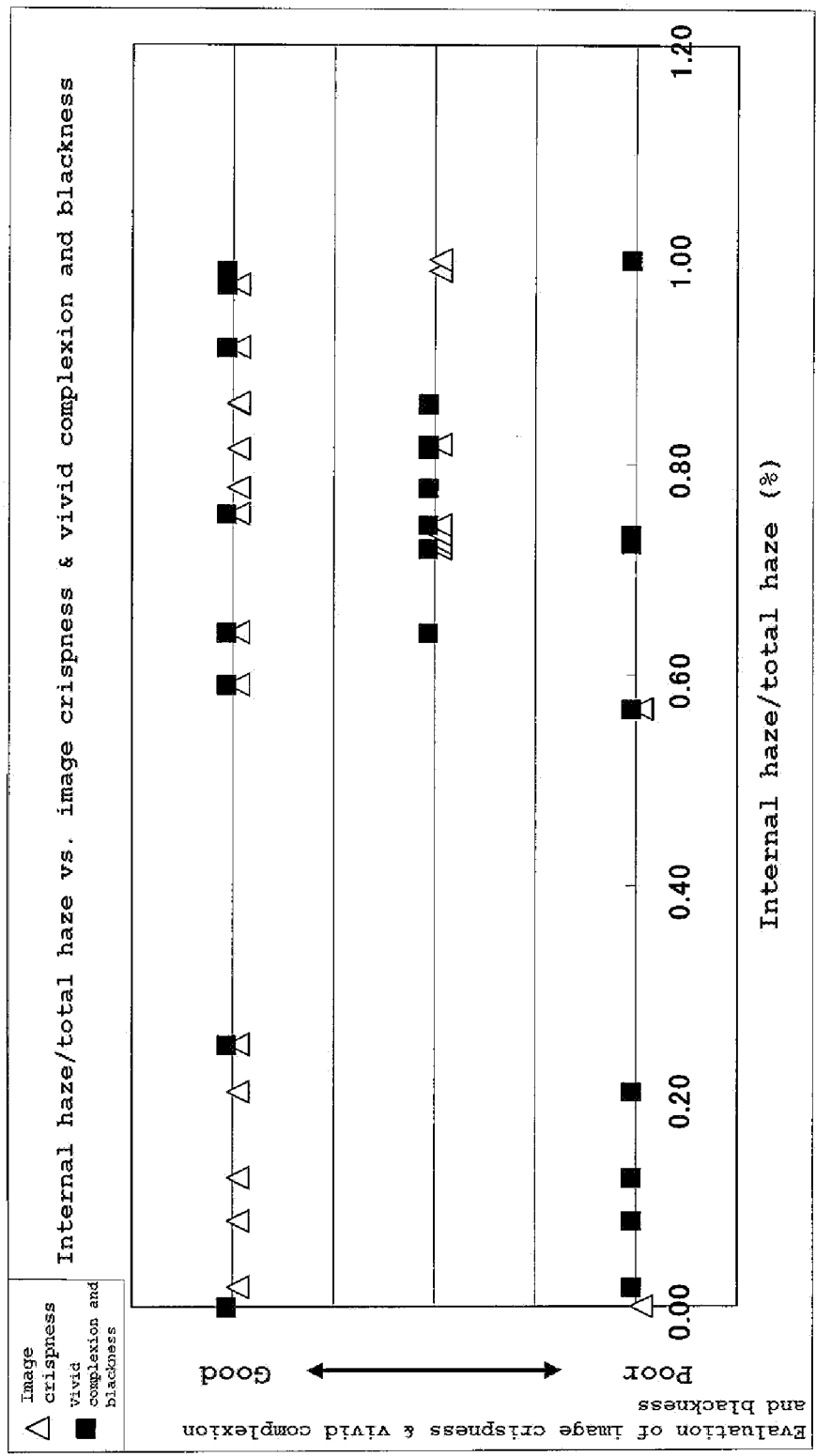
FIG. 8 is a graph showing the relationship between internal haze/total haze, vivid complexion and blackness and image crispness.
Figure 9:
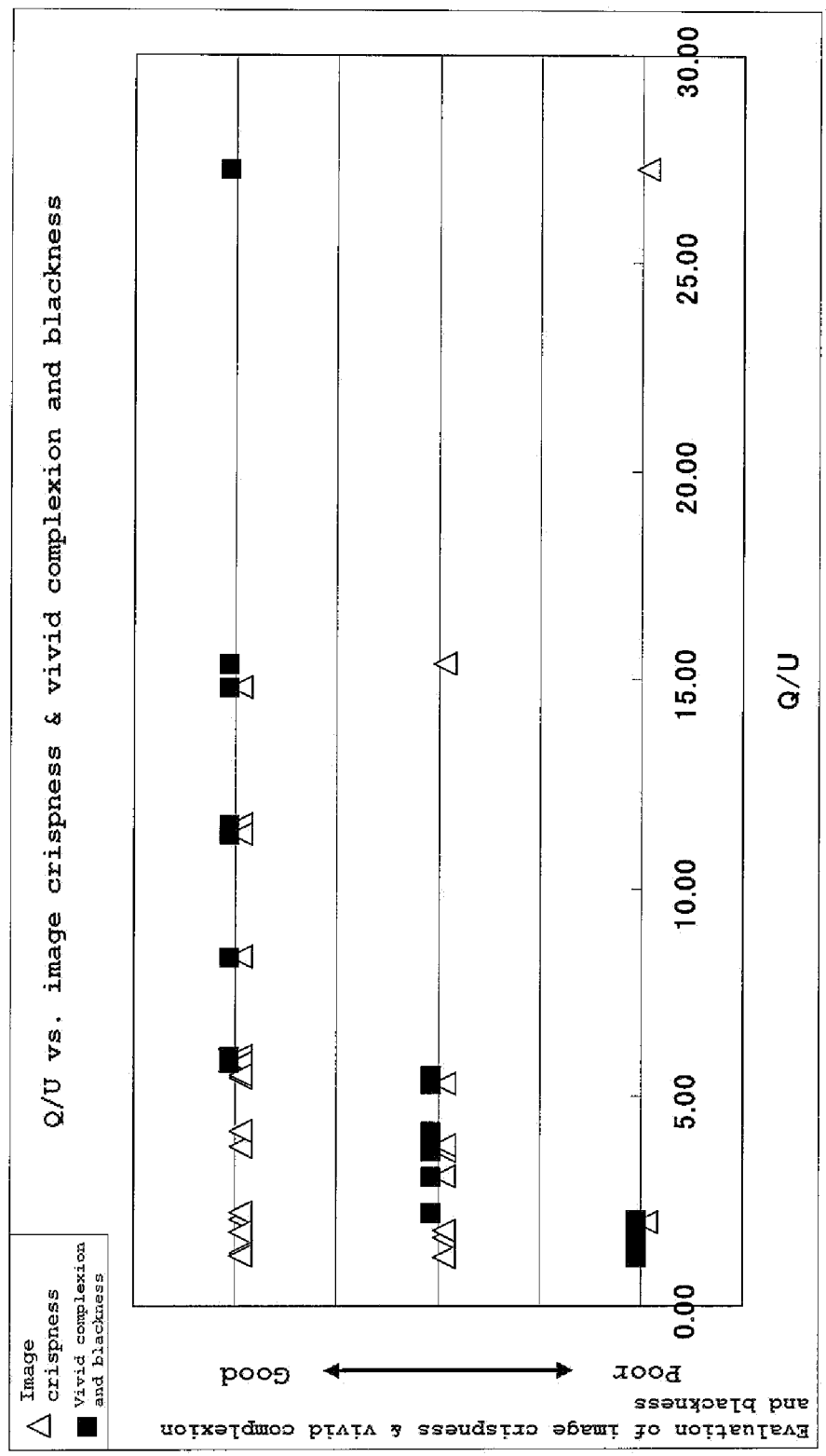
FIG. 9 is a graph showing the relationship between Q/U of the invention, vivid complexion and blackness and image crispness.
Figures 1, 10:
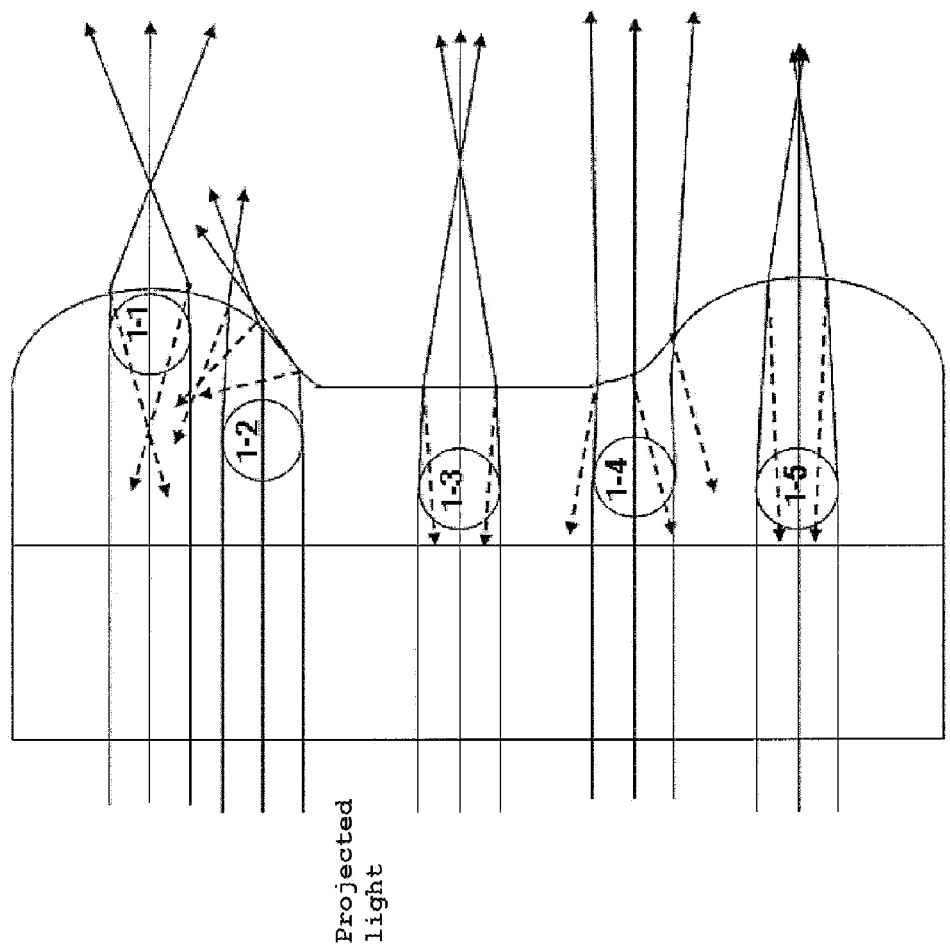
Figures 2, 10:
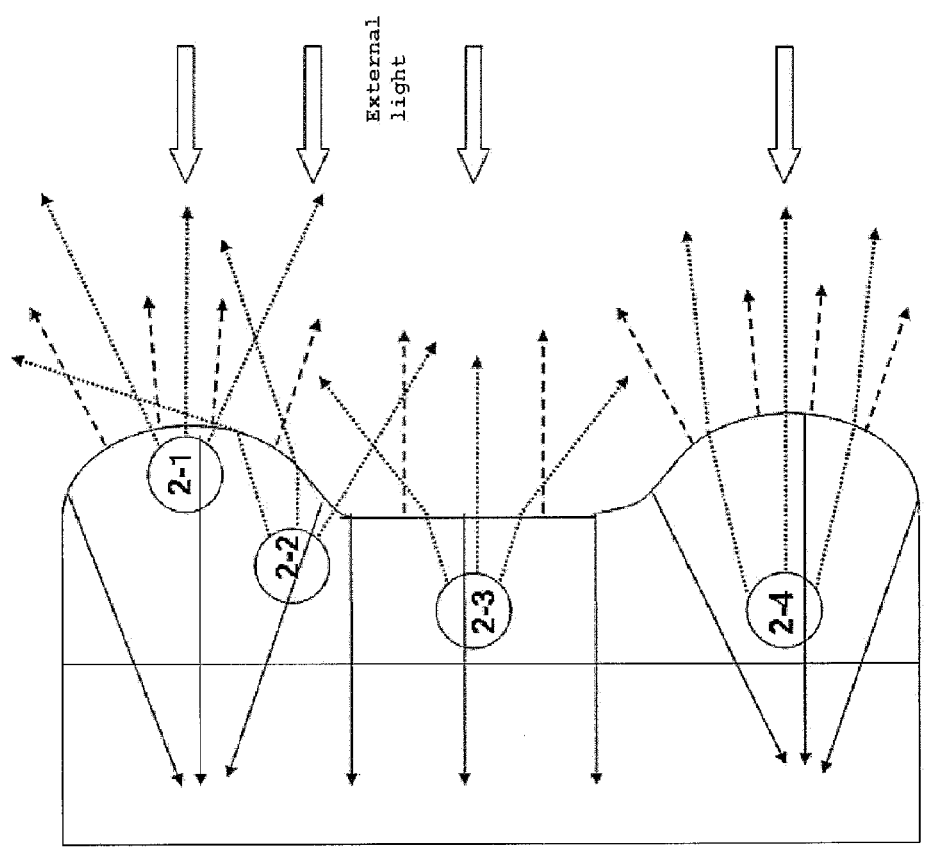
Figures 1, 11:
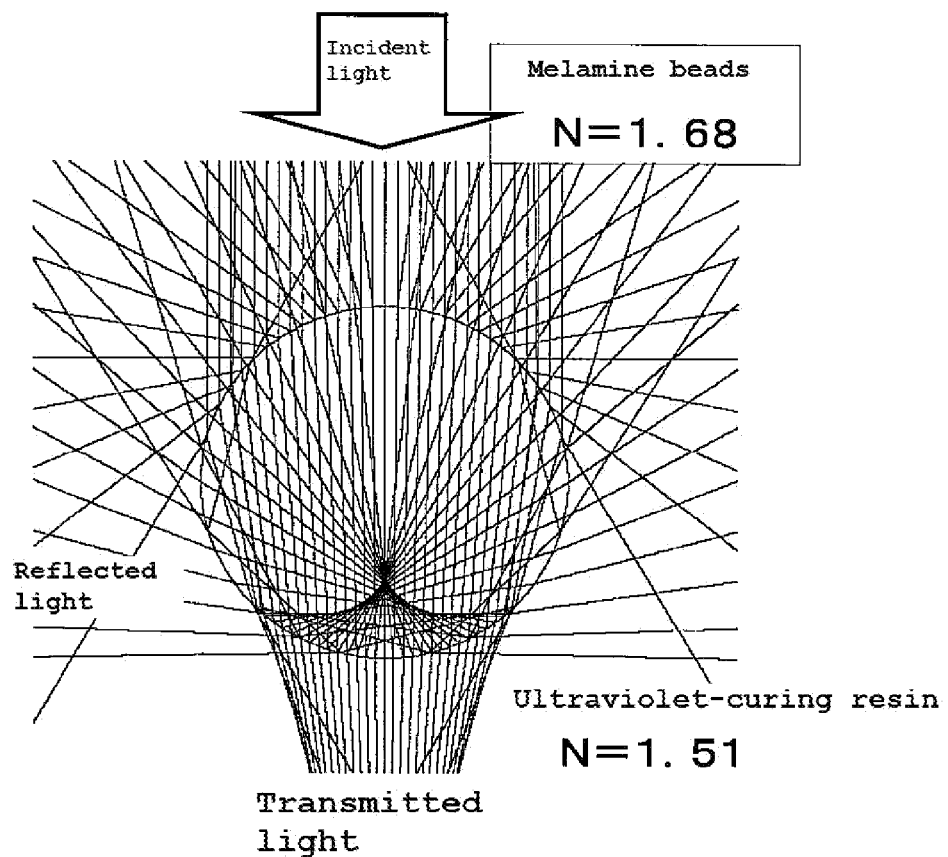
Figures 2, 11:
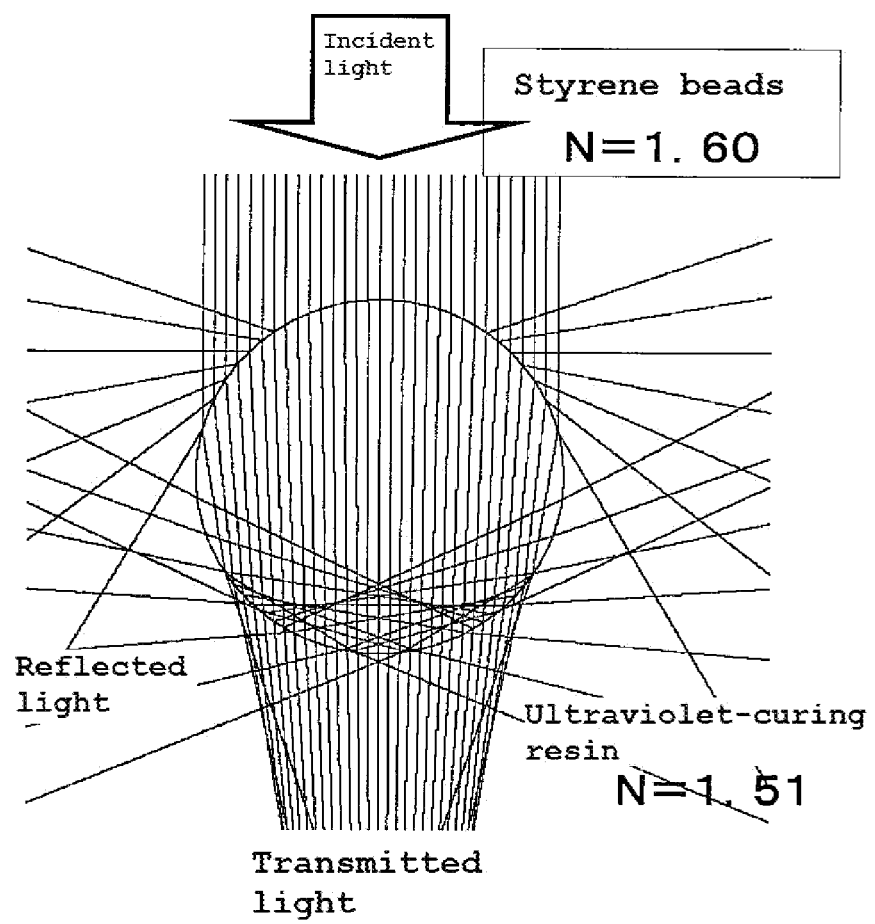
Figures 3, 11:
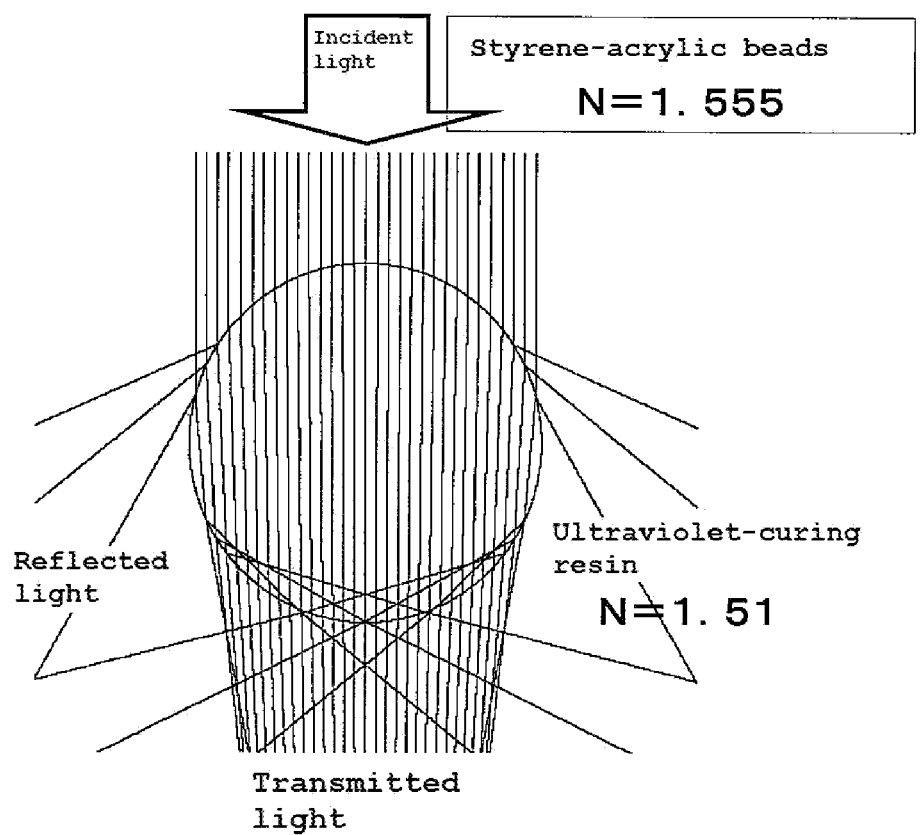
Figures 4, 11:
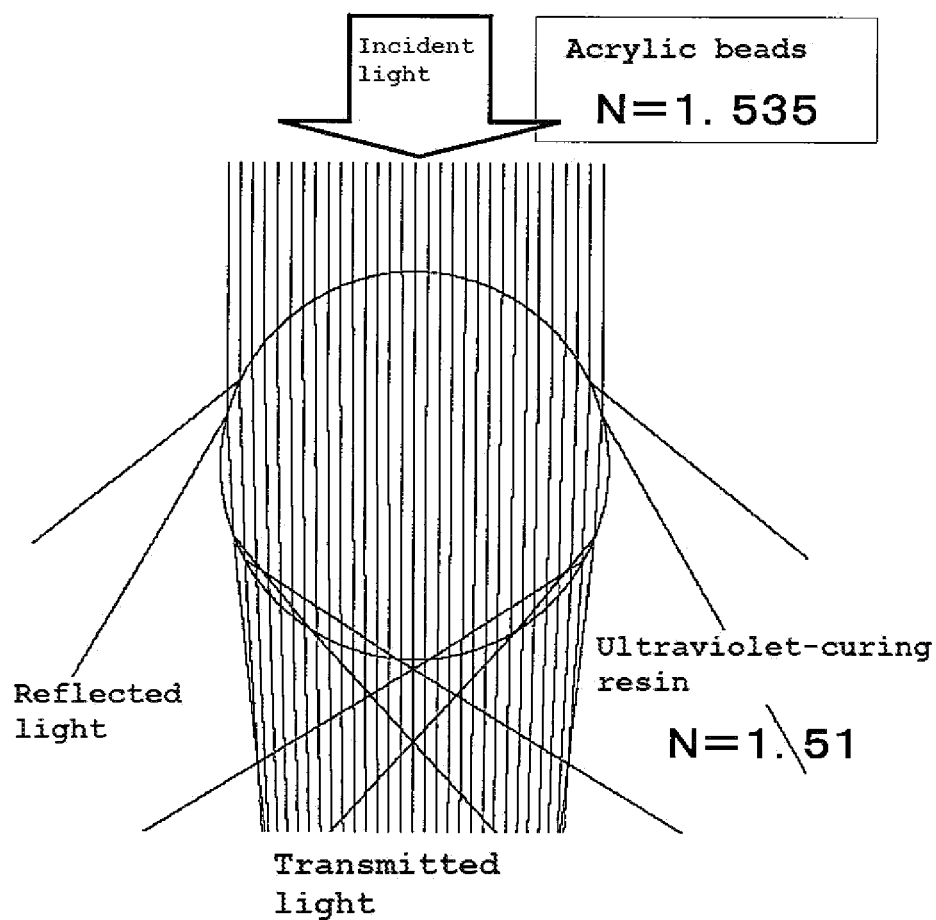

When visible light rays are irradiated from direction 5 onto the anti-glare sheet for a liquid crystal display device shown in FIG. 5, regular transmission occurs in direction 6, while part of the light is diffused. The transmission intensity in direction 6, i.e. at 0 degrees, is the regular transmission intensity Q.

Figure 1:
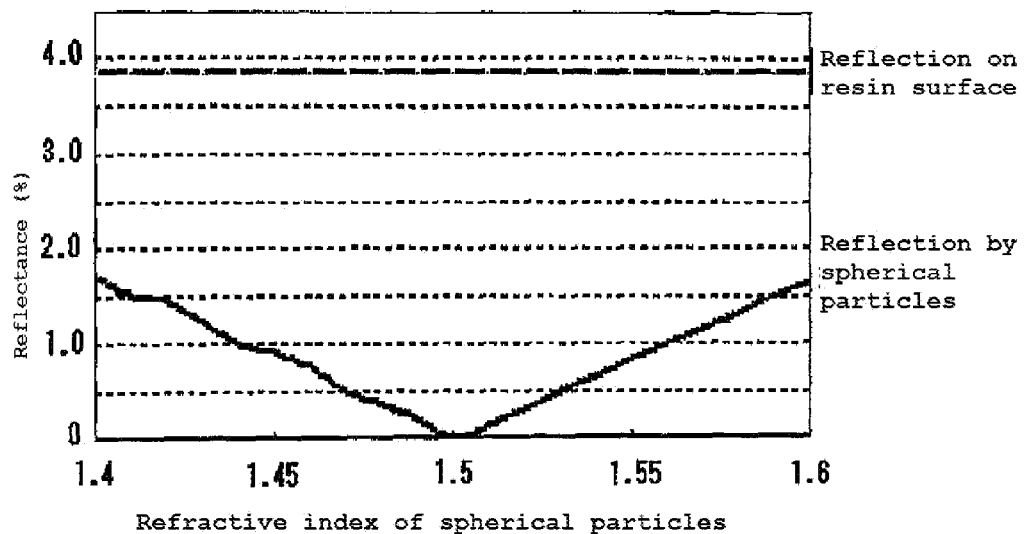
FIG. 1 is a graph showing reflectance by spherical particles and a resin.
Figure 2:
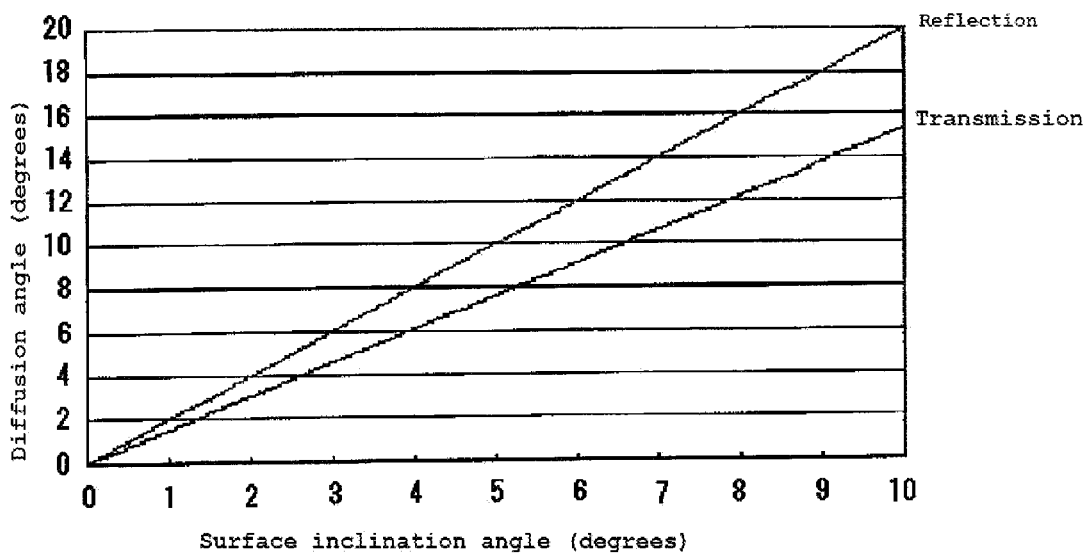
FIG. 2 is a graph showing the angles of reflection and transmission with respect to surface inclination angle.
Figure 3:
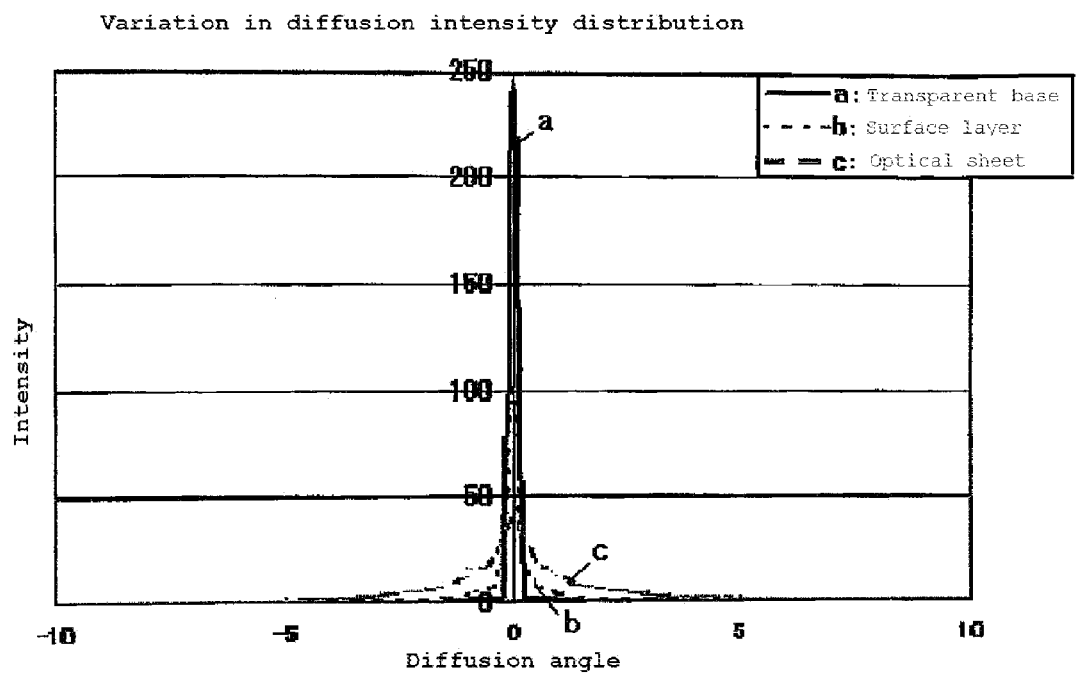
FIG. 3 is a graph showing diffusion intensity distribution.
Figure 4:
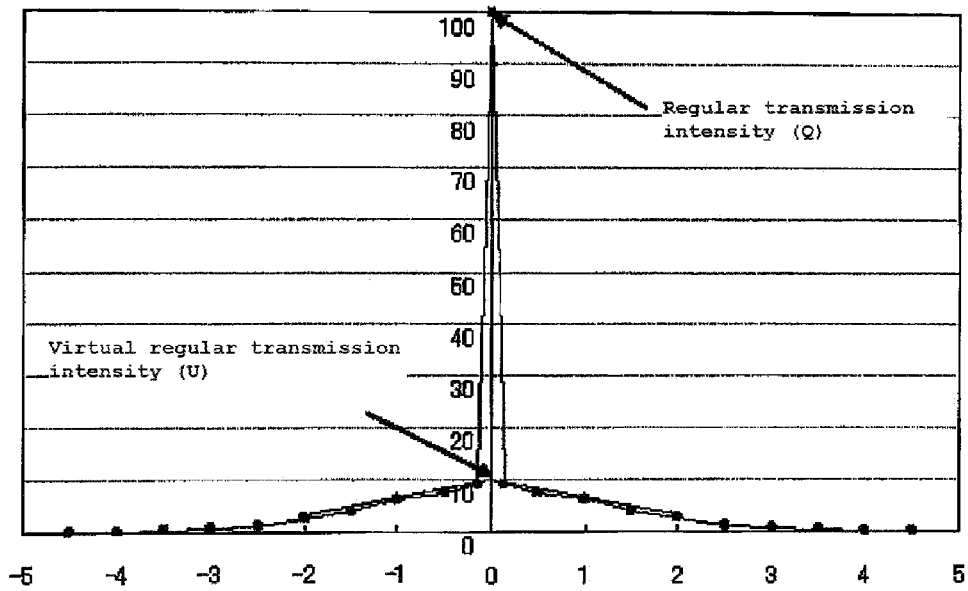
FIG. 4 is a conceptual drawing illustrating the principle of the evaluation method of the invention.

The transmission intensities at regular transmission ±2 degrees and regular transmission ±1 degree are measured, the intensities are connected with a straight line, and the transmission intensity extrapolated at regular transmission (0 degrees) is defined as the virtual regular transmission intensity U (see FIG. 4).

By controlling the material selection and production conditions in the production process for the anti-glare sheet for a liquid crystal display device, using Q/U as the index, it is possible to accomplish efficient production of an anti-glare sheet for a liquid crystal display device having excellent vivid complexion and blackness and excellent image crispness, while exhibiting the function of a functional layer.

Specifically, the diffuse transmission intensity is measured in the following manner.

(Method of Measuring Diffuse Transmission Intensity)

Visible light rays are irradiated perpendicularly from the back side of the anti-glare sheet for a liquid crystal display device (the side of the anti-glare sheet for a liquid crystal display device opposite the observer side). A light beam is directed onto the anti-glare sheet for a liquid crystal display device and the diffuse transmission intensity of the diffusion transmitted light is measured by scanning with a photodetector one degree at a time in a range of −85 to +85 degrees.

The apparatus used to measure the diffuse transmission intensity is not particularly restricted, but a "GC5000 L" by Nippon Denshoku Industries Co., Ltd. was used for the invention. The measurement was carried out in the range of −85 to +85 degrees, but since calculation of the virtual regular transmission intensity and measurement of the regular transmission intensity can be conveniently accomplished by measurement only at −1, −2, 0, +1 and +2 degrees, automatic adjustment within the indicated range can be easily made while varying the production conditions online.

Control using the following inequality (I) as the index is a feature of the invention.

$$2.15<Q/U<24.18 \qquad (I)$$

If Q/U is greater than 2.15 and less than 24.18, it is possible to obtain an anti-glare sheet for a liquid crystal display device with excellent vivid complexion and blackness and satisfactory image crispness. From the viewpoint of obtaining even more satisfactory vivid complexion and blackness, Q/U is more preferably greater than 5.57. From the viewpoint of obtaining even more satisfactory image crispness, Q/U is more preferably less than 15.10.

From the viewpoint of obtaining even more satisfactory image crispness, obtaining satisfactory vivid complexion and blackness and allowing display of both still images and moving images, Q/U is preferably at least 2.24 and no greater than 21.10, and most preferably at least 5.81 and no greater than 14.81.

The anti-glare sheet for a liquid crystal display device of the invention satisfies inequality (I) above. An anti-glare sheet for a liquid crystal display device satisfying inequality (I) above has excellent vivid complexion and blackness and satisfactorily excellent image crispness.

In order to ensure that $2.15<Q/U<24.18$ according to the invention, it is essential to adjust the transmission luminance distribution and intensity by the internal diffusion factor and external diffusion factor.

The method for adjusting the transmission luminance distribution and intensity by the internal diffusion factor may be a method in which translucent inorganic particles and/or translucent organic particles (hereunder also referred to simply as "translucent particles") are dispersed in the resin composing the functional layer.

This can also be accomplished by appropriately setting the solvent composition in the coating solution to be used for coating of the functional layer, the transparent resin that is to compose the functional layer, the shapes of the translucent particles to be dispersed in the transparent resin, the particle sizes, the amount of addition and the refractive index, and by controlling the state of dispersion of the particles by varying the post-coating drying and ultraviolet irradiation conditions. The concentrations of additives other than the translucent particles added to the transparent resin can also influence the diffuse transmission intensity by the internal diffusion factor.

Examples of methods for adjusting the diffusion transmission intensity by the external diffusion factors include:

(1) a method of using a die with fine irregularities in the surface to transfer the irregular shape to the surface of the anti-glare sheet for a liquid crystal display device, (2) a method of forming irregularities in the surface by cure shrinkage of the resin composing the functional layer, such as an ionizing radiation curable resin, (3) a method of protruded hardening of the translucent fine particles from the surface layer to form irregularities in the surface (either covering the protruding fine particles with the resin composing the surface layer, or causing the fine particles to protrude out), and (4) a method of forming surface irregularities by external pressure.

As an example of method (1), an ionizing radiation curable resin may be mixed with the transparent base material, and a die having fine irregularities may be bonded to the coating layer of the ionizing radiation curable resin for curing by ionizing radiation, to form an irregular shape on the surface of the anti-glare sheet for a liquid crystal display device.

Method (2) can yield fine irregularities with a smooth surface and is therefore effective for glare prevention and prevention of unwanted reflection, while method (3) allows the performance to be adjusted by selection of the translucent particles and transparent resin, the coating film thickness, the solvent, the drying conditions and permeability into the transparent base material, and is therefore a shorter process with simpler operation, which is thus effective for allowing low-cost production.

On the other hand, adjustment of the internal diffusion factors and adjustment of the surface diffusion factors all affect adjustment of the interaction between the internal diffusion factors and external diffusion factors, and it is especially important to control the positional relationship between the state of aggregation due to changes in the lipophilicity and hydrophilicity as the composition of the coating solution and the solvent ratio change with time during drying, and the irregularities produced by sinking of the particles as the viscosity changes with time.

Method (3) for obtaining the external diffusion factor is a suitable method from the viewpoint that it allows external diffusion and internal diffusion to be imparted simultaneously by the type of translucent fine particles used, thereby simplifying the production process.

In addition, since the irregular surface is a superposition of fine irregularities with an acute angle component and therefore very large diffusion and stray light can be generated that can risk impairing the image quality, a transparent resin layer of 1.0 μm to 10 μm may be further provided on the irregular surface to moderate the surface irregularities and to inhibit and control surface diffusion.

At less than 1.0 μm the superposed irregularities may remain, and at greater than 10 μm the anti-glare sheet may tend to undergo curling due to polymerization shrinkage. From this viewpoint, the thickness of the transparent resin layer is preferably between 2.0 and 8.0 μm, and more preferably between 2.5 and 7.0 μm.

Incidentally, by increasing the thickness of the coating film of the transparent resin layer, it is possible to moderate the surface irregularities, while controlling surface diffusion and the interaction between internal diffusion factors and external diffusion factors by the coating solution viscosity, composition and the coating and drying conditions as well.

Also, in addition to specifying Q/U as explained above, the performance of the anti-glare sheet for a liquid crystal display device to be used on the surface of a liquid crystal display unit can be further improved by careful selection of the sum T of the thickness of the layer having a diffusion factor in the interior and the thickness of the transparent resin layer, the haze Ha of the anti-glare sheet for a liquid crystal display device, the haze Hi produced by internal diffusion factors, the relationship between haze Ha and haze Hi, combination of the binder resin of the diffusion layer, and the transparent base material resin.

With a small T, as the sum of the thickness of the layer having a diffusion factor in the interior and the thickness of the transparent resin layer, the hard coat property will be inferior, and with an excessive thickness the anti-glare sheet for a liquid crystal display device will curl due to contraction of the resin during curing.

Cracks will sometimes occur under the load applied to the anti-glare film by bending during the polarizing plate formation steps or attachment between the polarizing plate and liquid crystal device, and peeling will tend to occur at the interface particularly when bonding between the binder and fine particles is weak. If the thickness of the diffusion layer is large, strain at the interface will be increased by polymerization shrinkage, and peeling will tend to occur more easily.

That is, if T as the sum of the thicknesses of the layer having a diffusion factor in the interior and the transparent resin layer is less than 2.0 μm, the hard coat property will be inferior, and if it is greater than 12.0 μm, strain at the interface with the particles will be increased, tending to result in cracking under load applied to the anti-glare film.

For a more reliable hard coat property, T is more preferably 2.5 μm or greater. If the film thickness T is smaller than the particle sizes of the translucent particles, a side with a large angle of surface irregularities will be formed and stray light will be generated, potentially lowering the black luminance, and therefore the film thickness is preferably greater than the particle sizes of the translucent particles.

In a diffusion layer without a transparent resin layer, the effects of strain on the interface can potentially be increased, and therefore the thickness is preferably between 2.3 μm and 12.4 μm, more preferably between 2.5 μm and 11.8 μm, even more preferably between 2.5 μm and 11.5 μm, and most preferably between 3.0 μm and 8.5 μm, which will produce a condition most resistant to strain at the particle interfaces, or in other words, a condition with no cracking, while simultaneously satisfying the demand for hardness.

Glare may be generated if Hi, which is the haze produced by internal diffusion factors, is too small, while if it is greater than 35.0% the reduction in contrast will become notable due to lower resolution and reduced blackness in dark surroundings caused by generation of stray light, and clearance will also be impaired. Therefore, the haze Hi produced by internal diffusion factors is preferably at least 1.3% and less than 35.0%, more preferably at least 1.3% and no greater than 34.4%, and most preferably at least 1.3% and no greater than 16.9%.

The fundamental concept of the present invention is based on knowledge that the total haze is not the sum of internal diffusion and surface diffusion as understood according to the prior art, but rather that the total haze is affected by the three-dimensional positioning of the diffusion factors, in addition to internal diffusion and surface diffusion, or in other words, the total haze is internal haze+external haze+haze due to the interaction between internal diffusion factors and surface diffusion factors.

Furthermore, where the total haze of the anti-glare sheet for a liquid crystal display device is denoted as Ha % and the internal haze produced by internal diffusion factors is denoted as Hi %, the regular reflection component is large if the haze value determined by subtracting the internal haze from the total haze (external haze+haze due to interaction between internal diffusion factors and surface diffusion factors)=(Ha-Hi) % is small, and it cannot cover for the anti-glare property with internal diffusion of a size that does not adversely affect the contrast or resolution, while if it is too large, an extreme reduction in contrast is produced. Therefore, the haze (Ha-Hi) % is preferably between 0.2% and 13.7%, more preferably between 0.3% and 11.4%, and most preferably between 0.3% and 4.8%.

[Translucent Particles]

The translucent particles dispersed in the transparent resin will now be described in detail.

The translucent particles may be organic particles or inorganic particles, and a mixture of organic particles and inorganic particles may also be used.

The mean particle size of the translucent particles used in the anti-glare sheet for a liquid crystal display device of the invention is in the range of preferably 0.5 to 20 μm, more preferably 1 to 10 μm and most preferably 1 to 9.0 μm. Within this range it is possible to adjust the diffuse transmission intensity distribution by internal diffusion and/or external diffusion and/or by interaction between the internal haze and surface irregularities.

If the mean particle size of the translucent particles is at least 0.5 µm, the aggregation of particles will not be excessive and it will be easy to adjust formation of the irregularities, while if it is no greater than 20 µm, images with glare and shine will be prevented and a greater degree of design freedom will be ensured for the diffuse transmission intensity distribution.

Lower variation in the particle size of the translucent particles will also result in lower variation in the diffusion property, thus facilitating design of the diffuse transmission intensity distribution.

More specifically, (d75-d25)/MV is preferably no greater than 0.25 and more preferably no greater than 0.20, where MV is the mean diameter based on the weight average, d25 is the cumulative 25% diameter and d75 is the cumulative 75% diameter.

The cumulative 25% diameter is the particle size constituting 25 wt %, counting from the particles with small particle size among the particle size distribution, and the cumulative 75% diameter is the particle size constituting 75 wt %, counting in the same manner.

As an example of adjusting the variation in particle size, the synthesis reaction conditions may be modified, while classification after synthesis reaction is also an effective means.

With classification, the frequency may be increased or the degree intensified to obtain particles with the preferred distribution. The method used for classification is preferably an air classification method, centrifugal classification method, precipitating classification method, filtering classification method, electrostatic classification method or the like.

When the translucent particles are organic particles, the components in the coating solution can potentially permeate into the organic particles so that the original particle sizes of the particles differ in the layer with a diffusion factor, but the aforementioned "particle size" refers to the sizes of the particles in the layer with the diffusion factor.

The difference in refractive index between the transparent resin composing the functional layer and the translucent particles is preferably 0.005 to 0.25. If the difference in refractive index is at least 0.005 it will be possible to prevent glare, and if it is no greater than 0.25, design of the diffuse transmission intensity distribution will be facilitated.

From this viewpoint, the difference in refractive index is preferably 0.01 to 0.2 and more preferably 0.015 to 0.15.

The refractive index of the translucent particles is measured by measuring the turbidity with dispersion of equal amounts of the translucent particles in solvents with varying refractive indexes, obtained by varying the mixing ratio with two different solvents having different refractive indexes, measuring the refractive index of the solvent at minimum turbidity using an Abbe refractometer, or by using a Cargille reagent. Their refractive index can be determined by measuring the material itself, or otherwise it can be measured by removing the particles or fragments of the particles from the film after the anti-glare sheet for a liquid crystal display device has been formed, or by measuring a cut surface of the anti-glare sheet with an ellipsometer, or by measuring the laser interference of the anti-glare sheet.

Also, by using particles with essentially no difference in refractive index from the binder, larger than the visible light wavelength and smaller than the diffusion layer thickness, it is possible to provide surface irregularities alone, which is particularly useful for adjusting interaction between the interior and the surface irregularities. "Essentially no difference in refractive index from the binder" means that the presence of the particles is not visible under optical microscope observation.

The diffusion transmission intensity can be modified by using two different types of translucent particles with a specific gravity difference of 0.1 or greater, by using two different types of translucent particles with different particle sizes and a particle size difference of 0.5 µm or greater, by using two different types of translucent particles with a difference in refractive index of 0.01 or greater, by using hydrophilic and hydrophobic translucent particles, or by using spherical translucent particles and amorphous translucent particles together.

The specific gravity can be measured by liquid phase exchange or gas phase exchange (pycnometer method), the particle size can be measured by the Coulter counter method or optical diffraction scattering method, or by observing the optical laminate cross-section with a microscope such as an SEM or TEM, and the refractive index can be measured by direct measurement with an Abbe refractometer, on the material itself or exposing a cross-section after production of the anti-glare sheet for a liquid crystal display device, exposing a cross-section of the translucent fine particles or binder, or shaving off particle or binder fragments, or by a method using a Cargille reagent, such as the Becke method, measurement by laser interference of the anti-glare sheet, or by quantitative evaluation based on measurement of the spectral reflection spectrum or spectroscopic ellipsometry.

As translucent organic particles there may be used polymethyl methacrylate particles, polyacryl-styrene copolymer particles, melamine resin particles, polycarbonate particles, polystyrene particles, crosslinked polystyrene particles, polyvinyl chloride particles, benzoguanamine-melamine-formaldehyde particles, silicone particles, fluorine-based resin particles, a polyester-based resin, or the like, or organic particles with hollows or pores.

The translucent inorganic particles may be silica particles, alumina particles, zirconia particles, titania particles, talc particles, mica particles, kaolin particles, bentonite particles, or smectite particles such as montmorillonite, beidellite, nontronite, saponite, hectorite, sauconite or stevenite, or inorganic particles having hollows or pores.

Since even translucent fine particles having the same refractive index and particle size distribution will have a different diffuse transmission intensity distribution depending on the degree of aggregation of the translucent particles, the diffuse transmission intensity distribution can be modified by combining two or more translucent particles with different aggregation states, or using two or more inorganic particles with different silane coupling treatment conditions to alter the aggregation state.

In order to prevent aggregation of the translucent particles, it is preferred to employ a method of adding silica with a particle size of no greater than the wavelength of visible light rays, such as a particle size of no greater than about 50 nm.

As explained below, it may not be possible to control the state of aggregation, depending on the binder in the coating solution.

To obtain an internal diffusion effect, it is effective to use amorphous translucent particles of silica with a particle size of greater than the wavelength of visible light rays. Amorphous particles have an effect of widening the distribution of the transmitted scattering angle compared to spherical particles.

However, since amorphous translucent particles tend to generate stray light and widen the internal reflective distribution, they can affect the coating film diffusibility and interfere with adjustment of the diffuse transmission intensity, and therefore they are preferably added as necessary, such as when wide transmission scattering is desired.

More specifically, amorphous translucent particles are preferably added in a range of no greater than 50 wt % with respect to the total of the spherical particles and amorphous translucent particles.

The translucent particles are preferably added at 1-30 wt % and more preferably 2-25 wt % in the transparent resin (solid content). An amount of at least 1 wt % can help prevent unwanted reflection, while an amount of no greater than 30 wt % can minimize reduction in contrast and produce satisfactory visibility.

[Transparent Resin]

The transparent resin used to form the functional layer and transparent resin layer may be an ionizing radiation curable resin or thermosetting resin. For formation of the functional layer, a resin composition comprising the ionizing radiation curable resin or thermosetting resin may be coated onto a transparent base material, and the monomer, oligomer and prepolymer in the resin composition may be crosslinked and/or polymerized.

The functional groups of the monomer, oligomer and prepolymer are preferably ionizing radiation-polymerizable, and are especially photopolymerizable functional groups.

As photopolymerizable functional groups there may be mentioned unsaturated polymerizable functional groups such as (meth)acryloyl, vinyl, styryl and allyl.

As prepolymers and oligomers there may be mentioned acrylates such as urethane (meth)acrylate, polyester (meth)acrylate and epoxy (meth)acrylate, and unsaturated polyesters, epoxy resins and the like.

Monomers include styrene-based monomers such as styrene and α-methylstyrene; acrylic monomers such as methyl (meth)acrylate, 2-ethylhexyl (meth)acrylate, pentaerythritol (meth)acrylate, pentaerythritol tri(meth)acrylate, pentaerythritol tetra(meth)acrylate, pentaerythritolethoxy tetra(meth)acrylate, dipentaerythritol hexa(meth)acrylate, dipentaerythritol penta(meth)acrylate, trimethylolpropane tri(meth)acrylate, trimethylolpropaneethoxy tri(meth)acrylate, glycerin propoxy triacrylate, ditrimethylolpropane tetraacrylate, polyethyleneglycol di(meth)acrylate, bisphenol F EO-modified di(meth)acrylate, bisphenol A EO-modified di(meth)acrylate, isocyanuric acid EO-modified di(meth)acrylate, isocyanuric acid EO-modified tri(meth)acrylate, polypropyleneglycol di(meth)acrylate, trimethylolpropane PO-modified tri(meth)acrylate, trimethylolpropane EO-modified tri(meth)acrylate and ditrimethylolpropane tetra(meth)acrylate; polyol compounds having 2 or more thiol groups in the molecule, such as trimethylolpropane trithioglycolate, trimethylolpropane trithiopropylate and pentaerythritol tetrathioglycol, and urethane(meth)acrylates or polyester(meth)acrylates having 2 or more unsaturated bonds.

Polyfunctional acrylate monomers are particularly preferred, among which pentaerythritol tri(meth)acrylate, pentaerythritol tetra(meth)acrylate, dipentaerythritol hexa(meth)acrylate and dipentaerythritol penta(meth)acrylate are more preferred.

It is also preferred to combine an oligomer component such as a urethane polyfunctional acrylate with such monomers, to allow hardness and satisfactory crack resistance to be obtained.

As binders there may be used polymers added to the resin composition. Polymethyl methacrylate (PMMA) and cellulose acetate propionate (CAP) are examples of such polymers.

Addition of a polymer allows the viscosity of the coating solution to be adjusted, and this is advantageous in that it can facilitate coating while also facilitating modification of irregular shapes formed by particle aggregation and allowing sinking of the particles to be controlled, while it can also control surface diffusion and interaction between internal diffusion factors and external diffusion factors.

Furthermore, a polyfunctional acrylate is especially preferred to increase the crosslinking degree and provide scratch resistance, and different oligomers have effects of reducing polymerization contraction and preventing curling and cracking.

Incidentally, addition of an organosilane or fluorine resin as a binder will tend to result in phase separation or gelling during drying and curing, and roughness on the anti-glare layer surface. Also, cohesion of the particles varies considerably depending on the combination of the resin in the coating solution, the solvent system, and the lipophilicity/hydrophilicity of the particles, and the optical characteristics can become unstable. This is because, even with one type of particle, differences in volatility of solvents, of which usually two or more are present, produces changes in the composition during drying, making it difficult to control aggregation and dispersion. This is particularly notable when using two or more types of particles with different degrees of lipophilicity/hydrophilicity, and care must be taken when using, for example, a combination of inorganic particles and organic particles, or a combination of melamine, acryl, acryl-styrene copolymer and styrene particles.

A photoradical polymerization initiator may also be added to the resin composition if necessary. As photoradical polymerization initiators there may be used acetophenones, benzoins, benzophenones, phosphine oxides, ketals, anthraquinones, thioxanthones, azo compounds and the like.

As acetophenones there may be mentioned 2,2-dimethoxyacetophenone, 2,2-diethoxyacetophenone, p-dimethylacetophenone, 1-hydroxy-dimethylphenyl ketone, 1-hydroxy-dimethyl-p-isopropylphenyl ketone, 1-hydroxycyclohexylphenyl ketone, 2-methyl-4-methylthio-2-morpholinopropiophenone, 2-benzyl-2-dimethylamino-1-(4-morpholinophenyl)-butanone, 4-phenoxydichloroacetophenone and 4-t-butyl-dichloroacetophenone, and as benzoins there may be mentioned benzoin, benzoinmethyl ether, benzomethyl ether, benzoinisopropyl ether, benzyldimethylketal, benzoinbenzenesulfonic acid ester, benzointoluenesulfonic acid ester, benzoinmethyl ether, benzomethyl ether and the like.

As benzophenones there may be used benzophenone, hydroxybenzophenone, 4-benzoyl-4'-methyldiphenyl sulfide, 2,4-dichlorobenzophenone, 4,4-dichlorobenzophenone and p-chlorobenzophenone, 4,4'-dimethylaminobenzophenone (Michler's ketone), 3,3',4,4'-tetra(t-butylperoxycarbonyl)benzophenone, and the like.

A photosensitizer may also be used therewith in combination, specific examples of which include n-butylamine, triethylamine and poly-n-butylphosphine.

Using a plurality of phase separable resins as the transparent resin of the functional layer will also allow adjustment of the diffuse transmission intensity, primarily by the internal diffusion factors.

That is, by using a compatible component and a non-compatible component in admixture for the prepolymer, oligomer, monomer and polymer, it is possible to adjust the diffuse transmission intensity, primarily by the internal diffusion factors.

For example, when one resin is a styrene-based resin (polystyrene, styrene-acrylonitrile copolymer or the like), the other resin is preferably a cellulose derivative (a cellulose ester such as cellulose acetate propionate or the like), a (meth) acrylic-based resin (polymethyl methacrylate or the like), an alicyclic olefin-based resin (a polymer with norbornane as the monomer, or the like), a polycarbonate-based resin or a polyester-based resin.

When one resin is a cellulose derivative (a cellulose ester such as cellulose acetate propionate or the like), the other resin is preferably a styrene-based resin (polystyrene, styrene-acrylonitrile copolymer or the like), a (meth)acrylic-based resin (polymethyl methacrylate or the like), an alicyclic olefin-based resin (a polymer with norbornane as the monomer, or the like), a polycarbonate-based resin or a polyester-based resin.

The ratio of the combined resins (weight ratio) can be selected within the range of 1/99-99/1, preferably the range of 5/95-95/5, more preferably the range of 10/90-90/10, even more preferably the range of 20/80-80/20, and especially the range of 30/70-70/30.

In addition, if the prepolymer, oligomer or monomer used for the transparent resin to compose the functional layer and transparent resin layer is one with large polymerization shrinkage, it will be possible to accomplish adjustment of the diffuse transmission intensity primarily by the external diffusion factors. A larger polymerization shrinkage increases the surface irregularities, thus widening the diffuse transmission intensity distribution.

Conversely, addition of a compatible polymer to the ionizing radiation curable resin or thermosetting resin, or addition of fine particles that are no larger than the wavelength of light, such as fine particles that are no larger than 100 nm, as a filler can reduce polymerization shrinkage and allow adjustment of the diffusion transmission intensity by the external diffusion factor, or can alter the positional relationship of the microparticles by changing the coating solution viscosity, thus modifying the interaction.

Furthermore, addition of fine particles that are no larger than 100 nm, and have a high refractive index or low refractive index, to the ionizing radiation curable resin or thermosetting resin will modify the refractive index of the transparent resin to allow control of diffusion.

However, when an organosilane is included in the binder, cohesion of the particles will vary considerably depending on the combination of the resin in the coating solution, the solvent system and the lipophilicity/hydrophilicity of the particles, resulting in unstable optical characteristics, and therefore it is preferred to avoid using an organosilane.

The reason for this is conjectured to be that, even with one type of particle, differences in volatility of solvents (two or more usually being present) produces changes in the composition during drying, making it difficult to control aggregation and dispersion. This becomes particularly notable when using two or more types of particles with different degrees of lipophilicity/hydrophilicity, and when using, for example, a combination of inorganic particles and organic particles, or a combination of melamine, acryl, acryl-styrene copolymer and styrene particles. It can therefore become impossible to control roughness and glare.

A solvent will usually be added to the radiation-curing resin composition to adjust the viscosity or to allow dissolution or dispersion of each of the components. The type of solvent used will alter the surface condition of the coating film in the coating and drying steps, and it is therefore selected as appropriate in consideration of allowing adjustment of the transmission intensity distribution by external diffusion. Specifically, it is selected in consideration of the saturation vapor pressure and permeability into the transparent base material.

In the production process of the invention, the resin composition used to form the functional layer preferably contains an ionizing radiation curable resin as the transparent resin, translucent particles, and a solvent.

The resin composition preferably contains a solvent that is impregnated into the transparent base material (hereinafter also referred to as "permeable solvent"), and/or an ionizing radiation curable resin that is impregnated into the transparent base material, and a solvent that is not impregnated into the transparent base material and/or an ionizing radiation curable resin that is not impregnated into the transparent base material.

By adjusting the amount of impregnation into the transparent base material it is possible to control the thickness of the functional layer, and thus allow modification of the diffuse transmission intensity.

More particularly, the diffuse transmission intensity can be controlled by the amount of impregnation into the transparent base material and the sizes of the translucent particles.

Specifically, when the amount of impregnation of the solvent and/or ionizing radiation curable resin (hereinafter also referred to simply as "solvent mixture") into the base material is low and the translucent particle sizes are small, a functional layer is formed with the majority of the particles embedded in the solvent mixture, but since the translucent particles tend to aggregate, the surface irregularities are relatively large.

On the other hand, when using a combination of a solvent mixture with a large amount of impregnation into the transparent base material and translucent particles with small particle sizes, aggregation of the translucent particles is reduced and the surface irregularities are relatively small.

When using a combination of a solvent and/or an ionizing radiation curable resin with a large amount of impregnation into the transparent base material and translucent particles with large particle sizes, the thickness of the functional layer is reduced, resulting in protrusion of the translucent particles out from the functional layer, forming surface irregularities due to the translucent particles.

In contrast, when using a combination of a solvent mixture with a small amount of impregnation into the transparent base material and translucent particles with large particle sizes, the thickness of the functional layer is increased, thus inhibiting protrusion of the translucent particles into the surface and resulting in relatively small surface irregularities.

By thus adjusting the amount of impregnation of the solvent and/or ionizing radiation curable resin into the transparent base material and effecting control by combination with different particle sizes of translucent particles, it is possible to form surface irregularity shapes of various sizes.

This method is particularly effective when the transparent base material is a cellulose-based resin.

Furthermore, by using a solvent that is capable of being impregnated into particles, it will be easier for at least some of the transparent resin component to permeate into the particles, and the difference in refractive index between the particles and the transparent resin will vary to allow control of the diffusion transmission intensity.

Furthermore, a single type of solvent may be used, or two or more different solvents with different boiling points and/or relative evaporation rates at ordinary temperature/ordinary pressure may be included.

By using two or more different solvents, it is possible to achieve a wide range of control of the solvent drying speed. A high drying speed results in volatilization, and thus less solvent and higher viscosity, before aggregation of the particles has occurred, such that no further aggregation takes place.

Thus, control of the drying speed accomplishes control of the secondary particle sizes of the translucent particles, and as explained above, it is linked with control of the diffuse transmission intensity by the relationship with the degree of penetration of the solvent and/or ionizing radiation curable resin into the base material.

The relative evaporation rate is the speed calculated by the following formula according to ASTM-D3539, with a larger value representing faster evaporation. Relative evaporation rate=Time required for evaporation of n-butyl acetate/time required for evaporation of solvent.

The specific solvent may be appropriately selected in consideration of the aforementioned explanation, and specifically there may be mentioned aromatic solvents such as toluene and xylene, and ketones such as methyl ethyl ketone (MEK), methyl isobutyl ketone (MIBK) and cyclohexanone.

Any of these may be used alone or in combinations of two or more. It is preferred to use a mixture of at least one type of aromatic solvent and at least one type of ketone. To control the drying speed, there may be combined therewith a cellosolve such as methylcellosolve or ethylcellosolve, a cellosolve acetate, or an alcohol such as ethanol, isopropanol, butanol or cyclohexanol.

Additives other than translucent particles may also be added to the transparent resin in the anti-glare sheet for a liquid crystal display device of the invention, as necessary. For example, various inorganic particles may be added to improve the optical characteristics, including the physical properties such as hardness, and the reflectance and diffusibility.

As inorganic particles there may be mentioned metals such as zirconium, titanium, aluminum, indium, zinc, tin and antimony, and metal oxides such as $ZrO_2$, $TiO_2$, $Al_2O_3$, $In_2O_3$, ZnO, $SnO_2$, $Sb_2O_3$, ITO, ATO or $SiO_2$. Also included are carbon, MgF, silicon, $BaSO_4$, $CaCO_3$, talc, kaolin and the like.

The particle sizes of the inorganic particles are preferably as micronized as possible in the resin composition during coating of the functional layer, in order to minimize the effect on the diffuse transmission intensity distribution, and the mean particle size is preferably in a range of no greater than 100 nm.

By micronizing the inorganic particles to no greater than 100 nm, it is possible to form an anti-glare sheet for a liquid crystal display device that does not impair the transparency. The particle sizes of the inorganic particles can be measured by the light scattering method or using an electron micrograph.

According to the invention, various surfactants may be used for an anti-aggregation effect and anti-settling effect, as well as to improve the properties such as the leveling property. A polyether-modified silicone oil is preferred as a leveling agent to obtain the aforementioned effect while maintaining a satisfactory condition for the optical characteristics and physical properties.

As surfactants there may be mentioned silicone oils, fluorine-based surfactants, and fluorine-based surfactants, preferably containing perfluoroalkyl groups.

When the resin composition containing the solvent is coated and dried, a difference in surface tension is produced between the membrane surface and the inner surface in the coated film, whereby multiple convection currents are created within the film. The convection currents result in an orange peel surface and coating defects.

This also adversely affects the vivid complexion and blackness and image crispness. When such a surfactant is used it is possible to prevent such convection currents, thus resulting not only in a concavoconvex film without defects or irregularities, but also facilitating adjustment of the diffuse transmission intensity property.

According to the invention there may also be added stain-proofing agents, antistatic agents, coloring agents (pigments and dyes), flame retardants, ultraviolet absorbers, infrared absorbers, tackifiers, polymerization inhibitors, antioxidants, surface modifiers and the like.

The transparent base material used in the anti-glare sheet for a liquid crystal display device of the invention is not particularly restricted so long as it is one that is commonly used in anti-glare sheets for liquid crystal display devices, and it may be a transparent resin film, transparent resin plate, transparent resin sheet, transparent glass panel, or the like.

As transparent resin films there may be used triacetylcellulose films (TAC films), diacetylcellulose films, acetylbutylcellulose films, acetylpropylcellulose films, cyclic polyolefin films, polyethylene terephthalate films, polyethersulfone films, polyacrylic-based resin films, polyurethane-based resin films, polyester films, polycarbonate films, polysulfone films, polyether films, polymethylpentene films, polyetherketone films, (meth)acrylonitrile films, polynorbornane-based resin films and the like.

In particular, a TAC film or cyclic polyolefin film is preferred when the anti-glare sheet for a liquid crystal display device of the invention is to be used together with a polarizing plate, since these do not interfere with polarized light, and a polyester film such as a polyethylene terephthalate film is preferred if emphasis is on mechanical strength and smoothness.

The transparent base material may be a multilayer or monolayer material, and a primer layer may also be provided on the surface for adhesion with the coating film.

In order to prevent interference patterns produced at the interface when a substantial difference in refractive index exists between the transparent base material and coating film layer, an anti-interference pattern layer with a refractive index intermediate between the transparent base and coating film layer may be provided between them, or irregularities of about 0.3-1.5 μm may be formed as surface roughness (ten-point height of irregularities: Rz).

The Rz value is measured according to JIS B0601 1994.

Functions such as a hard coat property, prevention of unwanted reflection, anti-reflection, an antistatic property or an antifouling property may be imparted to the anti-glare sheet for a liquid crystal display device of the invention.

The hard coat property is usually evaluated based on the pencil hardness (measured according to JIS K5400), or by a 10-pass abrasion test using steel wool #0000 under a load, evaluating the maximum load under which no damage is observed with black tape attached to the back side (steel wool scuff resistance).

The pencil hardness of the anti-glare sheet for a liquid crystal display device of the invention is preferably H or greater, and more preferably 2H or greater.

The steel wool scuff resistance is preferably 200 $g/cm^2$ or greater, more preferably 500 $g/cm^2$ or greater and even more preferably 700 $g/cm^2$ or greater.

Antistatic performance is preferably imparted from the viewpoint of preventing static electricity on the surface of the anti-glare sheet for a liquid crystal display device.

To impart antistatic performance, there may be mentioned methods known in the prior art, such as a method of coating a conductive coating solution comprising conductive fine particles, a conductive polymer, a quaternary ammonium salt, thiophene or the like and a reactive curing resin, or a method of forming a conductive thin-film by vapor deposition or sputtering of a metal or metal oxide that forms a transparent film.

The antistatic layer may also be used as a portion of a functional layer, such as for hard coating, prevention of unwanted reflection, anti-reflection or the like.

The surface resistance value is an index of the antistatic property, and according to the invention the surface resistance value is preferably no greater than $10^{12}$ Ω/sq., more preferably no greater than $10^{11}$ Ω/sq. and especially no greater than $10^{10}$ Ω/sq. The "saturated electrostatic voltage", or the maximum voltage at which the optical film can accumulate, is preferably no greater than 2 kV at an applied voltage of 10 kV.

An antifouling layer may also be provided on the outer surface of the anti-glare sheet for a liquid crystal display device of the invention. An antifouling layer lowers the surface energy and inhibits adhesion of hydrophilic or lipophilic contaminants.

The antifouling layer can be imparted by adding a stain-proofing agent, and as stain-proofing agents there may be mentioned fluorine-based compounds, silicon-based compounds and their mixtures, among which fluoroalkyl group-containing compounds are particularly preferred.

A method for producing an anti-glare sheet for a liquid crystal display device of the invention will now be explained in detail. According to the invention, it is essential to control the production conditions so that the inequality 2.15<Q/U<24.18 as an index is satisfied, as mentioned above.

The anti-glare sheet for a liquid crystal display device of the invention is produced by coating the resin composition that is to form the functional layer on a transparent base material.

The coating method may be any of various known methods, such as dip coating, air knife coating, curtain coating, roll coating, wire bar coating, gravure coating, die coating, blade coating, microgravure coating, spray coating or spin coating, for example.

According to the invention, the transmission scattering luminance property varies depending on the coating amount, and therefore roll coating, gravure coating or die coating is preferred, as such methods can facilitate stably obtaining a range of 2 to 12 μm for the sum of the thicknesses of the layer having a diffusion factor in the interior, and the transparent resin layer.

After coating by any of the aforementioned methods, the sheet is transported into a heated zone to dry the solvent, or another known method is used to dry the solvent.

By selecting the relative evaporation rate of the solvent, the solid concentration, the coating solution temperature, the drying temperature, the drying air speed, the drying time and the dry zone solvent atmosphere concentration, it is possible to adjust the external diffusion due to the profile of the surface irregularity shapes, and the internal diffusion due to the translucent particles or additives.

A method of adjusting the transmission scattering luminance property by selection of the drying conditions is particularly preferred and convenient. Specifically, the drying temperature is preferably 30° C. to 120° C. and the drying wind speed is 0.2-50 m/s, as the transmission scattering luminance property can be controlled with appropriate adjustment in this range.

More specifically, controlling the type of solvent and the drying temperature allows adjustment of the permeability of the resin and the solvent into the base material. That is, by controlling the drying temperature, given the same solvent conditions, it is possible to adjust the permeability of the resin and solvent into the base material, and as explained above, this is linked with control of the diffuse transmission intensity by the relationship between the translucent particles and particle sizes.

For example, when the resin composition used to form the functional layer comprises a transparent resin, translucent particles having a higher refractive index than the transparent resin, and a solvent, the refractive index of the permeable low-molecular component in the transparent resin is lower than the refractive index of the translucent particles, and the leveling property and settling and aggregation of the translucent particles are approximately equivalent, then a longer drying time until curing will result in permeation of the low refraction components in the transparent resin into the transparent base material, a higher refractive index of the transparent resin, and a lower difference in refractive index with the translucent particles.

On the other hand, since the proportion of the translucent particles with respect to the transparent resin increases, the translucent particles tend to protrude out from the surface, so that surface irregularities readily form.

Thus, a longer drying time reduces the internal diffusion while simultaneously increasing the external diffusion.

Incidentally, this permeability can be utilized for adhesiveness between the transparent base material and functional layer by an anchor effect, or to prevent generation of interference patterns that become notable when the difference in refractive index between the transparent base material and functional layer is 0.03 or greater.

This permeation layer that is produced by permeation of the low refraction component in the transparent resin into the transparent base material exhibits a function as a refractive index-modifying layer wherein the refractive index between the transparent base material and functional layer varies continuously.

Also, by increasing the drying speed, the aggregation time of the translucent particles is shortened so that aggregation is impeded, thus exhibiting the same effect as an actual reduction in the particle sizes of the translucent particles.

That is, by controlling the drying speed it is possible to control the sizes of the translucent particles that are used, and as explained above, this is linked with control of the diffuse transmission intensity based on the relationship with the degree of penetration of the solvent and/or ionizing radiation curable resin into the base material.

[Evaluation Methods]
1. Coating Film Thickness

The anti-glare sheet for a liquid crystal display device of the invention is provided with a functional layer on a translucent base material, and finally has a layer with an irregular shape on the outer surface of the observer side. The functional layer on the base material will sometimes be a multilayer and sometimes a monolayer, and the coating film thickness is the sum of the thicknesses of the layer having a diffusion factor in the interior and the transparent resin layer.

2. Film Thickness: T (μm) Measurement Method

A confocal microscope (LeicaTCS-NT: product of Leica Microsystems GmbH, magnification: 50-500×) was used for transmission observation of a cross-section of the optical laminate, and the presence or absence of an interface was evaluated on the following scale.

Measurement Procedure (1) In order to obtain clear images without halation, observation was made using a wet objective lens in a confocal microscope, placing approximately 2 ml of oil with a refractive index of 1.518 on the optical laminate. The oil was used to eliminate the air layer between the objective lens and the optical laminate.

(2) The film thickness from the base material was measured at a maximum height and minimum recess in the irregularities in a single screen, at 1 point each for a total of 2 points, measuring 5 screens for a total of 10 points, and the mean value was calculated as the coating film thickness.

In cases where the interface is not distinct under the confocal microscope, a cross-section of the anti-glare sheet for a liquid crystal display device can be prepared with a microtome and observed by SEM, and the film thickness can be calculated in the same manner as (2) above.

3. Total haze: Ha(%) Measurement Method

The total haze value can be measured according to JIS K-7136 (2000). The device used for measurement may be an HM-150 haze meter (Murakami Color Research Laboratory Co., Ltd.).

The haze is measured with the transparent base material surface facing the light source.

4. Internal Haze: Hi(%) Measurement Method

The internal haze used for the invention was determined in the following manner. A resin having a refractive index equal to that of the resin forming the surface irregularities, or at least having a difference in refractive index of no greater than 0.02, which may be, for example, a recoating agent such as pentaerythritol triacrylate (including resin components such as monomers or oligomers) is diluted with toluene or the like to a solid content of 60%, and coated with a wire bar to a dry film thickness of 8 µm, over the irregularities on the outer surface of the observer side of an anti-glare sheet for a liquid crystal display device. This crushes the irregularities on the surface to form a flat surface.

However, when the presence of a leveling agent in the composition used to form the functional layer with an irregular shape causes cissing of the recoating agent and inhibits wetting, the anti-glare sheet for a liquid crystal display device may be pretreated with hydrophilic treatment by saponification (immersion in a 2 mol/l NaOH (or KOH) solution at 55° C. for 3 minutes, followed by rinsing and complete removal of water droplets with a Kimwipe, and then 1 minute of drying in an oven at 50° C.). The surface-flattened sheet has only internal haze, because it has no surface irregularities and no interaction.

The haze of the sheet can be measured by the same method as for the total haze according to JIS K-7136(2000), and determined as the internal haze.

The haze component due to interaction between the internal diffusion factor and surface diffusion factor, which affects the total haze other than internal haze, can be calculated as Ha-Hi(%).

5. Hard Coat Property Evaluation Method

"Hardness", for an anti-glare sheet for a liquid crystal display device of the invention, is pencil hardness of 2H or greater in a pencil hardness test, simultaneously with mar proofness of 200 g/cm$^2$ or greater in a mar proofness test.

(1) The pencil hardness can be measured according to JIS K-5400. The device used for measurement may be a pencil hardness tester (product of Toyo Seiki Co., Ltd.). The pencil hardness test determines the hardness of a pencil used without outer defects such as scratches in at least 3 of 5 pencil hardness tests. For example, when a 2H pencil is used for 5 tests, and no outer defects occur in 3 tests, the pencil hardness of the optical laminate is recorded as 2H.

(2) The mar proofness was determined by rubbing the irregular outer surface of the anti-glare sheet for a liquid crystal display device 20 times using #0000 steel wool under a 200 g weight, and visually confirming the presence of any scratches. The evaluation was made on the following scale.

A: Absolutely no scratches found.
B: Fine scratches (no more than 5) found.
C: Numerous scratches, and peeling. Overall evaluation from (1) and (2)
G: Pencil hardness of 2H or greater, evaluation of A.
F: Pencil hardness of 2H or greater, evaluation of B.
P: All cases that failed to satisfy the above.

6. Cracking Evaluation Method

The anti-glare sheet for a liquid crystal display device was wrapped around the core rod of a cylindrical mandrel used in the bending test of JIS K5600-5-1, and evaluation was performed based on generation of cracks.

The cracks were assumed to be produced as a result of strain at the particle interfaces.

G: Satisfactory without generation of cracks, even when wound around an 8 mm core rod.
G*: Generation of one crack when wound around an 8 mm core rod.
P*: Generation of 2 to 5 cracks when wound around an 8 mm core rod.
P: Generation of numerous cracks when wound around an 8 mm core rod.

The evaluation of G* indicates potential use as a product, and was considered equivalent to G for the overall evaluation.

7. Measurement of Regular Transmission Intensity

This was measured for each of the anti-glare sheets for a liquid crystal display device fabricated in the production examples, by the methods described throughout the present specification.

8. Evaluation of Vivid Complexion and Blackness and Image Crispness

The polarizing plate on the outer surface of a KDL-40X2500 liquid crystal television by Sony Corporation was released and a polarizing plate without surface coating was attached.

Next, a sample produced by each production example was attached thereover with the surface-coated side as the outer surface, using a transparent pressure-sensitive adhesive film for an optical film (product with total light transmittance: ≥90%, haze: ≤0.5%, film thickness: 10-55 µm, such as one of the MHM Series by Nichiei Kakoh Co., Ltd.).

The liquid crystal television was set in a room in an environment with an illuminance of about 1,000 Lx, the DVD "Phantom of the Opera" by Media Factory, Inc. was displayed thereon, and the image was viewed by 15 subjects from a location about 1.5-2.0 m distant from the liquid crystal television, at different vertical and horizontal angles, for sensation evaluation of the following properties, each on a 3-level scale. The evaluation criteria were as follows, with the most frequent evaluation result recorded as the final result.

(1) Vivid complexion and blackness: For display of dynamic images, this was judged based on high contrast (black glaze and black tightness), with stereoscopic visual effect, gloss and brightness in the image, and sense of motion. The percentage of viewers that responded with a satisfactory evaluation was calculated and evaluated as follows.

Stereoscopic Visual Effect
G: At least 65% of viewers responded with satisfactory evaluation.
F: At least 30% and less than 65% of viewers responded with satisfactory evaluation.
P: Less than 30% of viewers responded with satisfactory evaluation.

Sense of Motion
G: At least 65% of viewers responded with satisfactory evaluation.
F: At least 30% and less than 65% of viewers responded with satisfactory evaluation.
P: Less than 30% of viewers responded with satisfactory evaluation.

Vivid Complexion and Blackness
G: Evaluation of G for both stereoscopic visual effect and sense of motion.
F: Evaluation of G and F or both F for stereoscopic visual effect and sense of motion.
P: Evaluation of P for stereoscopic visual effect or sense of motion.

(2) Blackness in dark surroundings: The liquid crystal television was set in a room in an environment with an illuminance of no greater than 5 Lx, a black screen was displayed, and the image was viewed by 15 subjects from a location about 1.5-2.0 m distant from the liquid crystal television, at different vertical and horizontal angles, for sensation evaluation of the following properties, each on a 3-level scale.

The black screen was displayed on the screen of an externally connected laptop computer (Sony VAIO), with the entire background color set to "black". The evaluation criteria were as follows, with the most frequent evaluation result recorded as the final result.

Black display in dark surroundings was judged by whether or not gray was present and black could be seen without the impression of opalescence. The percentage of viewers that responded with a satisfactory evaluation was calculated and evaluated as follows.
G: At least 65% of viewers responded with satisfactory evaluation.
F*: At least 50% and less than 65% of viewers responded with satisfactory evaluation.
F: At least 30% and less than 50% of viewers responded with satisfactory evaluation.
P: Less than 30% of viewers responded with satisfactory evaluation.

(3) Image crispness: For display of still images, this was judged based on high contrast, excellent prevention of unwanted reflection (a condition without disturbance by virtual images of observer or observer background), and visibility of still images. The percentage of viewers that responded with a satisfactory evaluation was calculated and evaluated as follows.
G: At least 65% of viewers responded with satisfactory evaluation.
F: At least 30% and less than 65% of viewers responded with satisfactory evaluation.
P: Less than 30% of viewers responded with satisfactory evaluation.

(4) Glare: This was judged based on whether glare was in an acceptable range during display of still images. The percentage of viewers that responded with a satisfactory evaluation was calculated and evaluated as follows.
G: At least 50% of viewers responded that glare was in an acceptable range.
P: Less than 50% of viewers responded that glare was in an acceptable range.

(5) Black tightness: The liquid crystal television was evaluated for blackness during power-off and blackness during power-on, as viewed directly from the front. The result was expressed as the degree of blackness. The percentage of viewers that responded with a satisfactory evaluation was calculated and evaluated as follows.
G: At least 65% of viewers responded with satisfactory evaluation.
F: At least 30% and less than 65% of viewers responded with satisfactory evaluation.
P: Less than 30% of viewers responded with satisfactory evaluation.

(6) Black glaze: A material comprising an anti-glare sheet for a liquid crystal display device attached to a black acrylic board using a transparent pressure-sensitive adhesive film for an optical film, was placed on a horizontal plane and a visual sense evaluation was conducted by 15 viewers from the regular reflection direction on a 45 degree-incident plane with the triple wavelength tube lit, judging whether or not glazed black could be reproduced. The percentage of viewers that responded with a satisfactory evaluation was calculated and evaluated as follows.
G: At least 65% of viewers responded with satisfactory evaluation.
F: At least 30% and less than 65% of viewers responded with satisfactory evaluation.
P: Less than 30% of viewers responded with satisfactory evaluation.

(7) Roughness: An anti-glare sheet for a liquid crystal display device was attached to a black acrylic board using a transparent pressure-sensitive adhesive film for an optical film, and it was viewed from various directions by 15 viewers under light-room conditions of 1000 Lx, judging whether or not the surface roughness was acceptable. The percentage of viewers that responded with a satisfactory evaluation was calculated and evaluated as follows.
G: At least 50% of viewers responded that roughness acceptable.
P: Less than 50% of viewers responded that roughness was acceptable.

(8) Overall Evaluation
G: Evaluation of G for image crispness and vivid complexion and blackness, no evaluation of P for roughness, glare, hard coat property or cracking.
F: Evaluation of G and F or both F for image crispness and vivid complexion and blackness, no evaluation of P for roughness, glare, hard coat property or cracking.
P: Evaluation of P for any one among property image crispness, vivid complexion and blackness, roughness, glare, hard coat property or cracking.

EXAMPLES

The invention will now be explained in greater detail by examples, with the understanding that the invention is in no way limited by the examples.

Production Example 1

Triacetylcellulose (80 μm thickness, FujiFilm Corp.) was prepared as a transparent base material. The transparent resin used was a mixture of pentaerythritol triacrylate (PETA), dipentaerythritol hexaacrylate (DPHA) and polymethyl methacrylate (PMMA) (weight ratio: PETA/DPHA/PMMA=86/5/9) (refractive index: 1.51), polystyrene particles (refractive index: 1.60, mean particle size: 3.5 μm, (d75-d25)/MV=0.05) and styrene-acrylic copolymer particles (refractive index: 1.56, mean particle size: 3.5 μm, (d75-d25)/MV=0.04) were added thereto as translucent particles, at 18.5 and 3.5 parts by weight, respectively, with respect to 100 parts by weight of the transparent resin, IRGACURE 184 (product of BASF, Japan) was added as an initiator at 5 parts by weight, and a polyether-modified silicone oil (TSF4460, product of Momentive Performance Materials, Inc.) was added as a leveling agent at 0.04 part by weight.

A resin composition obtained by mixing a mixed solvent of toluene (boiling point: 110° C., relative evaporation rate: 2.0) and cyclohexanone (boiling point: 156° C., relative evaporation rate: 0.32) (weight ratio: 7:3) as the solvent at 190 parts by weight with respect to 100 parts by weight of the transparent resin, was coated onto the transparent base material and dry air at 70° C. was circulated at a flow rate of 0.2 m/s for 1 minute of drying.

Next, it was irradiated with ultraviolet rays (200 mJ/cm$^2$ under a nitrogen atmosphere) to cure the transparent resin, to fabricate an anti-glare sheet for a liquid crystal display device. The coating film thickness was 3.5 μm. The results of evaluating the anti-glare sheet for a liquid crystal display device by the methods described above are shown in Table 2.

Production Examples 2-7, Production Examples 10-26, Production Example 30 and Production Examples 32-34

An anti-glare sheet for a liquid crystal display device was fabricated, changing the type of transparent base material, the type of transparent resin, the types and content of translucent particles, the type and content of the solvent, the drying conditions and the coating film thickness in Production Example 1, as listed in Table 1. The results of evaluating each anti-glare sheet for a liquid crystal display device in the same manner as Production Example 1 are shown in Table 2.

Production Example 8

Triacetylcellulose (80 μm thickness, FujiFilm Corp.) was prepared as a transparent base material.

The transparent resin used was pentaerythritol triacrylate (PETA, refractive index: 1.51), and there were added styrene-acrylic copolymer particles (refractive index: 1.51, mean particle size: 9.0 μm, (d75-d25)/MV=0.04) and polystyrene particles (refractive index: 1.60, mean particle size: 3.5 μm, (d75-d25)/MV=0.05) as translucent particles, at 10.0 parts by weight and 16.5 parts by weight, respectively, to 100 parts by weight of the transparent resin, and also IRGACURE 184 (product of BASF, Japan) as an initiator at 5 parts by weight and a polyether-modified silicone oil (TSF4460, product of Momentive Performance Materials, Inc.) as a leveling agent at 0.04 part by weight.

A resin composition obtained by mixing a mixed solvent of toluene (boiling point: 110° C., relative evaporation rate: 2.0) and cyclohexanone (boiling point: 156° C., relative evaporation rate: 0.32) (weight ratio: 7:3) as the solvent at 190 parts by weight with respect to 100 parts by weight of the transparent resin, was coated onto the transparent base material and dry air at 85° C. was circulated at a flow rate of 1 m/s for 1 minute of drying. This was irradiated with ultraviolet rays (100 mJ/cm$^2$ under an air atmosphere) for curing of the transparent resin, to obtain a diffusion layer with a coating film thickness of 5.0 μm.

A resin composition obtained by mixing PETA (pentaerythritol triacrylate, refractive index: 1.51) as the transparent resin, 5 parts by weight of the initiator IRGACURE 184 (product of BASF Japan), 0.04 part by weight of a polyether-modified silicone oil (TSF4460 by Momentive Performance Materials, Inc.) as a leveling agent, and a mixed solvent of toluene (boiling point: 110° C., relative evaporation rate: 2.0) and cyclohexanone (boiling point: 156° C., relative evaporation rate: 0.32) (weight ratio: 7:3) as the solvent, at 190 parts by weight with respect to 100 parts by weight of the transparent resin, was coated onto the coating film layer, and dry air at 70° C. was circulated at a flow rate of 5 m/s for 1 minute of drying (hard coat layer formation). This was irradiated with ultraviolet rays (200 mJ/cm$^2$ under a nitrogen atmosphere) to cure the transparent resin, to fabricate an anti-glare sheet for a liquid crystal display device.

The total coating film thickness was 11.0 μm. The results of evaluating the anti-glare sheet for a liquid crystal display device in the same manner as Production Example 1 are shown in Table 2.

Production Example 9

An anti-glare sheet for a liquid crystal display device was fabricated in the same manner as Production Example 8, except that the content of the polystyrene particles as the translucent particles in Production Example 8 was changed to 6.5 parts by weight with respect to 100 parts by weight of the transparent resin, and the total coating film thickness was 11.5 μm.

The results of evaluation in the same manner as Production Example 1 are shown in Table 2.

Production Examples 27-29, Production Example 31

An anti-glare sheet for a liquid crystal display device was fabricated in the same manner as Production Example 8, except for changing the coating film thickness of the first diffusion layer to 3 μm, the type of transparent base material, the type of transparent resin in the first and second layers, the type and content of the translucent particles in the first layer, the type and content of the solvent in the first and second layers, the drying conditions for the first and second layers, and the overall coating film thickness in Production Example 8, as listed in Table 1.

The results of evaluating each anti-glare sheet for a liquid crystal display device in the same manner as Production Example 1 are shown in Table 2.

TABLE 1

| Production Example | Transparent base Type | Transparent resin Type | Translucent particles Type | | Content | | Solvent Type | Content | Temp. (° C.) | Drying conditions Wind speed (m/s) | Time (min) | Coated film thickness (μm) |
|---|---|---|---|---|---|---|---|---|---|---|---|---|
| 1 | TAC | P | A | B | 18.5 | 3.5 | Y | 190 | 70 | 0.2 | 1.0 | 3.5 |
| 2 | TAC | P | A | — | 16.0 | — | Y | 190 | 70 | 1.0 | 1.0 | 3.5 |
| 3 | TAC | P | B | — | 9.0 | — | Y | 190 | 70 | 2.0 | 1.0 | 5.5 |
| 4 | TAC | Q | C | — | 12.0 | — | Y | 150 | 80 | 15.0 | 0.5 | 8.5 |
| 5 | TAC | Q | E | — | 8.0 | — | X | 190 | 70 | 10.0 | 0.5 | 2.0 |
| 6 | TAC | P | A | — | 16.0 | — | Y | 190 | 55 | 1.0 | 1.0 | 3.5 |
| 7 | TAC | P | A | B | 16.5 | 2.0 | Y | 190 | 55 | 5.0 | 1.0 | 4.0 |

TABLE 1-continued

| Production Example | Transparent base Type | Transparent resin Type | Translucent particles Type | | Content | | Solvent Type | Content | Drying conditions Temp. (°C.) | Wind speed (m/s) | Time (min) | Coated film thickness (μm) |
|---|---|---|---|---|---|---|---|---|---|---|---|---|
| 8  | TAC | Q/Q | C | A | 10.0 | 16.5 | Y/Y | 190/190 | 85/70 | 1/5 | 1/1 | 12.0 |
| 9  | TAC | Q/Q | C | A | 10.0 | 6.5 | Y/Y | 190/190 | 85/70 | 1/5 | 1/1 | 13.0 |
| 10 | TAC | Q | E | D | 1.0 | 5.0 | X | 190 | 60 | 10.0 | 0.5 | 2.5 |
| 11 | TAC | P | A | — | 16.0 | — | Y | 190 | 70 | 0.5 | 1.0 | 3.0 |
| 12 | TAC | P | A | B | 12.5 | 2.0 | Y | 150 | 100 | 25.0 | 0.5 | 4.0 |
| 13 | TAC | Q | E | D | 4.0 | 4.0 | X | 190 | 70 | 10.0 | 0.5 | 2.0 |
| 14 | TAC | Q | E | — | 9.0 | — | X | 190 | 70 | 10.0 | 0.5 | 2.0 |
| 15 | TAC | Q | D | E | 3.5 | 0.5 | X | 150 | 80 | 20.0 | 0.5 | 2.5 |
| 16 | PET | Q | E | — | 2.0 | — | X | 150 | 80 | 20.0 | 0.5 | 4.0 |
| 17 | PET | Q | D | — | 1.0 | — | X | 190 | 70 | 5.0 | 1.0 | 4.5 |
| 18 | TAC | Q | E | — | 3.0 | — | X | 150 | 50 | 50.0 | 0.5 | 5.0 |
| 19 | TAC | Q | — | — | — | — | X | 190 | 70 | 10.0 | 0.5 | 10.0 |
| 20 | TAC | P | B | — | 8.0 | — | Y | 190 | 55 | 3.0 | 1.0 | 3.5 |
| 21 | TAC | Q | E | D | 1.0 | 5.0 | X | 190 | 60 | 15.0 | 0.5 | 0.9 |
| 22 | TAC | P | B | — | 9.0 | — | Y | 190 | 65 | 3.0 | 1.0 | 16.0 |
| 23 | TAC | P | B | — | 9.0 | — | Y | 190 | 60 | 6.0 | 1.0 | 21.0 |
| 24 | TAC | P | A | — | 8.0 | — | Y | 190 | 70 | 1.0 | 1.0 | 3.0 |
| 25 | TAC | Q | B | — | 12.0 | — | Y | 150 | 80 | 15.0 | 0.5 | 3.5 |
| 26 | TAC | R | E | D | 1.0 | 5.0 | X | 190 | 70 | 1.0 | 1.0 | 3.0 |
| 27 | TAC | P/P | F | E | 14.0 | 1.0 | Y/Y | 150/150 | 70/40 | 20/0.5 | 0.5/0.5 | 7.1 |
| 28 | TAC | P/P | F | D | 14.0 | 1.0 | Y/Y | 150/150 | 70/70 | 20/0.5 | 0.5/0.5 | 6.8 |
| 29 | TAC | P/P | F | D | 12.0 | 3.0 | Y/Y | 150/150 | 70/70 | 0.5/0.5 | 0.5/0.5 | 5.3 |
| 30 | TAC | P | B | — | 7.0 | — | Y | 190 | 60 | 25 | 0.5 | 5.7 |
| 31 | TAC | P/P | F | D | 14.0 | 1.0 | Y/Y | 190/190 | 50/50 | 20/20 | 0.5/0.5 | 6.8 |
| 32 | TAC | P | B | — | 5.0 | — | X | 150 | 70 | 0.2 | 1 | 5.5 |
| 33 | TAC | P | C | — | 7.0 | — | X | 150 | 70 | 0.2 | 1 | 11.8 |
| 34 | TAC | P | A | — | 7.0 | — | X | 150 | 70 | 0.2 | 1 | 10.5 |

The following symbols are used in Table 1. The denotations of "/" for the production examples in the table are cases with a two-layer construction, and represent data for the lower layer on the left and the upper layer on the right.

A: Polystyrene particles (refractive index: 1.60, mean particle size: 3.5 μm, (d75-d25)/MV=0.05)

B: Styrene-acrylic copolymer particles (refractive index: 1.56, mean particle size: 3.5 μm, (d75d25)/MV=0.04)

C: Styrene-acrylic copolymer particles (refractive index: 1.51, mean particle size: 9.0 μm, (d75d25)/MV=0.04)

D: Amorphous silica (refractive index: 1.45, mean particle size: 1.5 μm, (d75-d25)/MV=0.6)

E: Amorphous silica (refractive index: 1.45, mean particle size: 2.5 μm, (d75-d25)/MV=0.8)

F: Styrene-acrylic copolymer particles (refractive index: 1.57, mean particle size: 3.5 μm, (d75d25)/MV=0.04)

P: Mixture of pentaerythritol triacrylate (PETA), dipentaerythritol hexaacrylate (DPHA) and polymethyl methacrylate (PMMA) (weight ratio: PETA/DPHA/PMMA=86/5/9) (refractive index: 1.51)

Q: Pentaerythritol triacrylate (PETA) (refractive index: 1.51)

R: Mixture of pentaerythritol triacrylate (PETA), dipentaerythritol hexaacrylate (DPHA), polymethyl methacrylate (PMMA) and acryloyloxypropyltrimethoxysilane (weight ratio: PETA/DPHA/PMMA=81/5/9/5) (refractive index: 1.50)

X: Mixture of toluene (boiling point: 110° C., relative evaporation rate: 2.0) and methyl isobutyl ketone (boiling point: 116° C., relative evaporation rate: 1.6) (weight ratio: 8:2)

Y: Mixture of toluene (boiling point: 110° C., relative evaporation rate: 2.0) and cyclohexanone (boiling point: 156° C., relative evaporation rate: 0.32) (weight ratio: 7:3)

TABLE 2

| | Parameter | | | | | | | | Physical performance | | | Blackness reproducibility | | |
|---|---|---|---|---|---|---|---|---|---|---|---|---|---|---|
| Prod. Ex. | Q/U | Hi | Ha-Hi | T | Glare | % | Roughness | % | HC property | Cracking | Physical Performance | Black tightness | % | Blackness in dark surroundings |
| 1 | 3.71 | 29.2 | 11.4 | 3.5 | G | 93 | G | 93 | G | G | G | G | 67 | F |
| 2 | 3.84 | 27.7 | 10.8 | 3.5 | G | 87 | G | 87 | G | G | G | G | 67 | F* |
| 3 | 8.37 | 7.9 | 2.6 | 5.5 | G | 73 | G | 73 | G | G | G | G | 80 | G |
| 4 | 5.46 | 1.6 | 0.9 | 8.5 | G | 60 | G | 60 | G | G | G | G | 100 | G |
| 5 | 1.26 | 1.9 | 21.6 | 2.0 | G | 80 | G | 87 | F | G | F | G | 67 | F* |
| 6 | 1.65 | 29.7 | 11.3 | 3.5 | G | 100 | G | 100 | G | G | G | F | 33 | F |
| 7 | 1.80 | 32.7 | 11.9 | 4.0 | G | 100 | G | 100 | G | G | G | P | 13 | F |
| 8 | 15.39 | 33.1 | 0.5 | 11.0 | G | 87 | G | 73 | G | G* | G | G | 67 | F |

TABLE 2-continued

| | | | | | | | | | | | | | | |
|---|---|---|---|---|---|---|---|---|---|---|---|---|---|---|
| 9  | 14.81 | 16.9 | 0.5  | 11.5 | G | 80  | G | 67  | G | G* | G | G | 73  | G |
| 10 | 5.99  | 1.3  | 0.9  | 2.5  | G | 60  | G | 60  | G | G  | G | G | 100 | G |
| 11 | 5.32  | 28.1 | 9.8  | 3.0  | G | 87  | G | 87  | G | G  | G | G | 67  | F* |
| 12 | 3.12  | 34.4 | 7.6  | 4.0  | G | 93  | G | 93  | G | G  | G | F | 47  | F |
| 13 | 2.06  | 2.1  | 8.2  | 2.0  | G | 73  | G | 73  | F | G  | F | G | 73  | F* |
| 14 | 1.21  | 2.8  | 20.2 | 2.0  | G | 80  | G | 87  | F | G  | F | F | 60  | F* |
| 15 | 3.80  | 2.8  | 0.8  | 2.5  | G | 60  | G | 60  | G | G  | G | G | 100 | G |
| 16 | 2.24  | 4.8  | 0.8  | 4.0  | G | 67  | G | 60  | G | G  | G | G | 93  | G |
| 17 | 27.26 | 0.0  | 1.3  | 4.5  | P | 40  | G | 53  | G | G  | G | G | 100 | G |
| 18 | 5.81  | 3.1  | 0.3  | 5.0  | G | 60  | G | 60  | G | G  | G | G | 100 | G |
| 19 | —     | 0.0  | 0.0  | 0.0  | G | 100 | G | 100 | P | G  | P | G | 100 | G |
| 20 | 1.77  | 0.3  | 16.0 | 3.5  | P | 20  | G | 93  | G | G  | G | F | 60  | F* |
| 21 | 11.53 | 1.6  | 0.9  | 0.9  | G | 53  | G | 60  | P | G  | P | G | 100 | G |
| 22 | 4.18  | 7.9  | 1.8  | 16.0 | G | 73  | G | 73  | G | P* | P | G | 80  | G |
| 23 | 5.51  | 7.9  | 1.3  | 21.0 | G | 73  | G | 73  | G | P  | P | G | 80  | G |
| 24 | 2.00  | 10.5 | 8.0  | 3.0  | G | 87  | G | 87  | G | G  | G | G | 73  | G |
| 25 | 1.18  | 21.5 | 0.1  | 3.5  | G | 80  | G | 80  | G | G  | G | G | 67  | F* |
| 26 | 11.30 | 1.2  | 3.6  | 13.0 | P | 47  | P | 33  | G | P  | P | G | 87  | G |
| 27 | 11.78 | 6.2  | 0.7  | 7.1  | G | 67  | G | 80  | G | G  | G | G | 80  | G |
| 28 | 12.11 | 6.8  | 1.3  | 6.8  | G | 67  | G | 67  | G | G  | G | G | 80  | G |
| 29 | 12.82 | 4.1  | 0.5  | 5.3  | G | 60  | G | 60  | G | G  | G | G | 93  | G |
| 30 | 13.35 | 8.6  | 4.8  | 5.7  | G | 73  | G | 73  | G | G  | G | G | 73  | G |
| 31 | 18.86 | 6.1  | 1.0  | 6.8  | G | 67  | G | 67  | G | G  | G | G | 80  | G |
| 32 | 20.10 | 4.0  | 0.3  | 5.5  | G | 60  | G | 60  | G | G  | G | G | 93  | G |
| 33 | 21.10 | 5.5  | 0.5  | 11.8 | G | 67  | G | 67  | G | G* | G | G | 87  | G |
| 34 | 18.60 | 26.3 | 0.7  | 10.5 | G | 80  | G | 80  | G | G* | G | G | 67  | F* |

| | | | | Still images and dynamic images | | | | | | | |
|---|---|---|---|---|---|---|---|---|---|---|---|
| | | | | Vivid complexion and blackness | | | | | | | |
| | Blackness reproducibility | | | | | | | Vivid com- plexion and black- ness | Image crisp- ness | Still images and dy- namic images | Overall evalu- ation |
| Prod. Ex. | Black gaze % | % | Black- ness repro- ducibility | Stereo- scopic visual effect | % | Sense of motion | % | | | % | |
| 1  | 33  | F | 60  | F | F | 53  | F | 47  | F | F | 60  | F | F |
| 2  | 53  | G | 67  | F | F | 53  | F | 47  | F | F | 53  | F | F |
| 3  | 80  | G | 80  | G | G | 73  | G | 73  | G | G | 87  | G | G |
| 4  | 100 | G | 87  | G | G | 67  | F | 60  | F | G | 73  | F | F |
| 5  | 60  | P | 13  | P | P | 13  | P | 20  | P | G | 67  | P | P |
| 6  | 33  | F | 53  | F | P | 20  | P | 13  | P | F | 33  | P | P |
| 7  | 33  | F | 40  | P | P | 27  | P | 20  | P | F | 33  | P | P |
| 8  | 40  | G | 87  | F | G | 87  | G | 80  | G | F | 60  | F | F |
| 9  | 73  | G | 87  | G | G | 87  | G | 80  | G | G | 80  | G | G |
| 10 | 100 | G | 87  | G | G | 67  | G | 67  | G | G | 87  | G | G |
| 11 | 53  | G | 67  | F | G | 67  | F | 60  | F | F | 60  | F | F |
| 12 | 33  | F | 60  | F | F | 47  | F | 40  | F | F | 53  | F | F |
| 13 | 60  | F | 60  | F | P | 27  | P | 27  | P | G | 67  | P | P |
| 14 | 60  | P | 20  | P | P | 13  | P | 20  | P | G | 67  | P | P |
| 15 | 93  | G | 87  | G | F | 60  | F | 53  | F | G | 73  | F | F |
| 16 | 87  | G | 87  | G | F | 40  | F | 33  | F | G | 73  | F | F |
| 17 | 100 | G | 80  | G | G | 100 | G | 100 | G | P | 13  | P | P |
| 18 | 93  | G | 100 | G | G | 67  | G | 67  | G | G | 80  | G | G |
| 19 | 100 | G | 100 | G | G | 100 | G | 100 | G | P | 0   | P | P |
| 20 | 60  | P | 27  | P | P | 27  | F | 33  | P | G | 67  | P | P |
| 21 | 100 | G | 87  | G | G | 80  | G | 80  | G | G | 100 | G | P |
| 22 | 80  | G | 80  | G | F | 67  | F | 53  | F | G | 73  | F | P |
| 23 | 80  | G | 80  | G | F | 60  | G | 67  | F | G | 73  | F | P |
| 24 | 67  | G | 67  | G | F | 40  | P | 20  | P | P | 27  | P | P |
| 25 | 60  | G | 87  | F | F | 33  | P | 7   | P | F | 47  | P | P |
| 26 | 100 | G | 80  | G | G | 80  | G | 80  | G | G | 93  | G | P |
| 27 | 87  | G | 87  | G | G | 80  | G | 80  | G | G | 100 | G | G |
| 28 | 80  | G | 80  | G | G | 80  | G | 80  | G | G | 100 | G | G |
| 29 | 87  | G | 93  | G | G | 80  | G | 80  | G | G | 100 | G | G |
| 30 | 73  | G | 74  | G | G | 80  | G | 80  | G | G | 93  | G | G |
| 31 | 87  | G | 87  | G | G | 87  | G | 87  | G | F | 40  | F | F |
| 32 | 87  | G | 93  | G | G | 93  | G | 93  | G | F | 33  | F | F |
| 33 | 87  | G | 93  | G | G | 93  | G | 93  | G | F | 33  | F | F |
| 34 | 53  | G | 87  | F | G | 87  | G | 80  | G | F | 53  | F | F |

For Production Examples 1 to 34, Q/U was calculated from the measurement results for the diffuse transmission intensity.

U was theoretically impossible to determine for Production Example 19.

The anti-glare sheets for a liquid crystal display device satisfying inequalities (1), (2), (3) and (4) for Q/U and Ha-Hi, as specified according to the invention, were demonstrated to have good balance, with excellent vivid complexion and blackness, and blackness in dark surroundings, as well as satisfactory image crispness.

Production Examples 1-4, 8-13, 15, 16, 18, 21-23 and 26-34 satisfy the inequality 2.15<Q/U<24.18, and Production Examples 3, 9-10, 18, 21 and 26-30 satisfy the inequality 5.57<Q/U<15.10, according to the invention, but it is seen that the other parameters are also important elements affecting anti-glare sheet performance. The other production examples correspond to comparative examples.

INDUSTRIAL APPLICABILITY

With the anti-glare sheet for a liquid crystal display device of the invention, it is possible to conveniently evaluate vivid complexion and blackness, and image crispness, which have not been evaluable by the conventional haze value, to thus stably provide an anti-glare sheet for a liquid crystal display device with excellent vivid complexion and blackness, excellent blackness in dark surroundings, and excellent image crispness.

REFERENCE SIGNS LIST

1. Anti-glare sheet for a liquid crystal display device
2. Base material
3. Surface layer
4. Translucent particle
5. Light beam incidence direction
6. Regular transmission direction

The invention claimed is:

1. A method for producing an anti-glare sheet for a liquid crystal display suitable for a combination of dynamic images and still images, comprising coating a resin composition on a transparent base material to form a functional layer thereby producing the anti-glare sheet, wherein the anti-glare sheet comprises:
the transparent base material,
the functional layer provided on at least one side of the transparent base material, and,
optionally, a transparent resin layer with a film thickness of 1.0 μm or greater on the side of the functional layer opposite the transparent base material side,
wherein the functional layer has a diffusion factor in the interior and has an irregular surface on the side opposite the transparent base material side,
wherein the anti-glare sheet for a liquid crystal display device is controlled so as to satisfy the following inequalities (1), (2), (3) and (4), $2.15 < Q/U < 24.18$, (1)

$0.2\% < Ha - Hi < 13.7\%$, (2)

$1.3\% \leq Hi < 35.0\%$, and (3)

$2.3 \text{ μm} < T < 12.4 \text{ μm}$, (4)

wherein Q is the intensity of regular transmission,
wherein U is the transmission intensity determined by extrapolating a straight line connecting the transmission intensities at regular transmission ±2 degree and regular transmission ±1 degree, to regular transmission, when visible light rays have been irradiated on the anti-glare sheet for a liquid crystal display device,
wherein T (μm) is the sum of the thicknesses of the layer having a diffusion factor in the interior and the optional transparent resin layer,
wherein Ha (%) is the haze of the anti-glare sheet for a liquid crystal display device, and
wherein Hi (%) is the haze produced by internal diffusion factors.

2. The method according to claim 1, wherein Q/U is in the relationship specified by the following inequality $2.24 \leq Q/U \leq 21.10$.

3. The method according to claim 1, wherein Q/U is in the relationship specified by the following inequality $5.81 \leq Q/U \leq 14.81$.

4. The method according to claim 1, wherein the transparent base material is a cyclic polyolefin or triacetylcellulose.

5. The method according to claim 1, wherein the functional layer comprises translucent inorganic particles and/or translucent organic particles dispersed in a transparent resin, and irregularities are provided on the surface of the functional layer by the translucent inorganic particles and/or translucent organic particles.

6. The method according to claim 1, wherein the transparent base material comprises a cellulose-based resin, the functional layer includes a transparent resin, the transparent resin is an ionizing radiation curable resin, the functional layer is formed by coating an ionizing radiation curable resin composition comprising the ionizing radiation curable resin on the transparent base material and subjecting it to crosslinking curing, the ionizing radiation curable resin composition comprises a solvent that is to be impregnated into the transparent base material and/or an ionizing radiation curable resin that is to be impregnated into the transparent base material, and a solvent that is not to be impregnated into the transparent base material and/or an ionizing radiation curable resin that is not to be impregnated into the transparent base material, and the amount of impregnation into the transparent base material is adjusted for control so that inequalities (1), (2), (3) and (4) above are satisfied.

7. The method according to claim 1, wherein the functional layer comprises a hard coat layer, and the steel wool scuff resistance is at least 200 g/cm$^2$.

8. The method according to claim 1, wherein the anti-glare sheet for a liquid crystal displace device has an anti-reflection functional layer formed on the uppermost surface layer.

9. The method according to claim 1, wherein the liquid crystal display suitable for combination of dynamic images and still images is a liquid crystal television.

10. A method for improving vivid complexion and blackness and image crispness of a liquid crystal display suitable for combination of dynamic images and still images, comprising providing the liquid crystal display that has an anti-glare sheet on a viewer side, wherein the anti-glare sheet comprises:
a transparent base material,
a functional layer provided on at least one side of the transparent base material, and,
optionally, a transparent resin layer with a film thickness of 1.0 μm or greater on the side of the functional layer opposite the transparent base material side, wherein the functional layer has a diffusion factor in the interior, and has an irregular surface on the side opposite the transparent base material side,
wherein the anti-glare sheet satisfies the following inequalities (1), (2), (3) and (4), $$2.15 < Q/U < 24.18, \quad (1)$$

$$0.2\% < Ha - Hi < 13.7\%, \quad (2)$$

$$1.3\% \leq Hi < 35.0\%, \text{ and} \quad (3)$$

$$2.3 \, \mu m < T < 12.4 \, \mu m, \quad (4)$$

wherein Q is the intensity of regular transmission,
wherein U is the transmission intensity determined by extrapolating a straight line connecting the transmission intensities at regular transmission ±2 degree and regular transmission ±1 degree, to regular transmission, when visible light rays have been irradiated on the anti-glare sheet for a liquid crystal display device,
wherein T (μm) is the sum of the thicknesses of the layer having a diffusion factor in the interior and the optional transparent resin layer,
wherein Ha (%) is the haze of the anti-glare sheet for a liquid crystal display device, and
wherein Hi (%) is the haze produced by internal diffusion factors.

11. The method according to claim 10, wherein Q/U is in the relationship specified by the following inequality:

$$24.24 \leq Q/U \leq 21.10.$$

12. The method according to claim 10, wherein Q/U is in the relationship specified by the following inequality:

$$5.81 \leq Q/U \leq 14.81.$$

13. The method according to claim 10, wherein the transparent base material is a cyclic polyolefin or triacetylcellulose.

14. The method according to claim 10, wherein the functional layer comprises translucent inorganic particles and/or translucent organic particles dispersed in a transparent resin, and irregularities are provided on the surface of the functional layer by the translucent inorganic particles and/or translucent organic particles.

15. The method according to claim 10, wherein the transparent base material comprises a cellulose-based resin, the functional layer includes a transparent resin, the transparent resin is an ionizing radiation curable resin, the functional layer is formed by coating an ionizing radiation curable resin composition comprising the ionizing radiation curable resin on the transparent base material and subjecting it to crosslinking curing, the ionizing radiation curable resin composition comprises a solvent that is to be impregnated into the transparent base material and/or an ionizing radiation curable resin that is to be impregnated into the transparent base material, and a solvent that is not to be impregnated into the transparent base material and/or an ionizing radiation curable resin that is not to be impregnated into the transparent base material, and the amount of impregnation into the transparent base material is adjusted for control so that inequalities (1), (2), (3) and (4) above are satisfied.

16. The method according to claim 10, wherein the functional layer comprises a hard coat layer, and the steel wool scuff resistance is at least 200 g/cm$^2$.

17. The method according to claim 10, wherein the anti-glare sheet for a liquid crystal display device has an anti-reflection functional layer formed on the uppermost surface layer.

18. The method according to claim 10, wherein the liquid crystal display suitable for combination of dynamic images and still images is a liquid crystal television.

* * * * *